US012794712B2

(12) United States Patent
Choi

(10) Patent No.: US 12,794,712 B2
(45) **Date of Patent: *Nov. 10, 2026**

(54) CHAIN OF AUTHENTICATION USING PUBLIC KEY INFRASTRUCTURE

(71) Applicant: Unho Choi, Seoul (CA)

(72) Inventor: Unho Choi, Seoul (CA)

( * ) Notice: Subject to any disclaimer, the term of this patent is extended or adjusted under 35 U.S.C. 154(b) by 417 days.

This patent is subject to a terminal disclaimer.

(21) Appl. No.: 17/472,058

(22) Filed: Sep. 10, 2021

(65) Prior Publication Data

US 2022/0114542 A1 Apr. 14, 2022

Related U.S. Application Data

(60) Provisional application No. 63/089,857, filed on Oct. 9, 2020, provisional application No. 63/089,834, filed on Oct. 9, 2020.

(51) Int. Cl.
*H04L 9/32* (2006.01)
*B60L 53/30* (2019.01)
(Continued)

(52) U.S. Cl.
CPC ............ *H04L 9/3268* (2013.01); *B60L 53/30* (2019.02); *G05D 1/0291* (2013.01); *G05D 1/104* (2013.01);
(Continued)

(58) Field of Classification Search
None
See application file for complete search history.

(56) References Cited

U.S. PATENT DOCUMENTS

| | | | | |
|---|---|---|---|---|
| 6,701,435 | B1 * | 3/2004 | Numao | H04L 9/085 713/168 |
| 6,941,285 | B2 | 9/2005 | Sarcanin | |

(Continued)

FOREIGN PATENT DOCUMENTS

| | | | |
|---|---|---|---|
| CN | 107810617 | A | 3/2018 |
| CN | 109328444 | A | 2/2019 |

(Continued)

OTHER PUBLICATIONS

Morselli et al., "Key Chains: A Decentralized Public-Key Infrastructure," Technical Report CS-TR-4788, University of Maryland, Retrieved from the Internet: URL—https://citeseerx.ist.psu.edu/document?repid=rep1&type=pdf&doi=7704be9a5f57fe4c82414ae11211e44440591a4d, 2006.

(Continued)

*Primary Examiner* — Neha Patel
*Assistant Examiner* — Jahed Ali
(74) *Attorney, Agent, or Firm* — Quantum Patent Law Firm; Seongyoune Kang

(57) ABSTRACT

A method for sequential authentication based on chain of authentication using public key infrastructure (PKI) is provided. The method includes receiving, by an $n^{th}$ party, an $(n-1)^{th}$ modified public key from an $(n-1)^{th}$ party; generating, by the $n^{th}$ party, an $n^{th}$ private key and an $n^{th}$ public key corresponding to each other; generating, by the $n^{th}$ party, an $n^{th}$ modified public key by concatenating the $(n-1)^{th}$ modified public key and the $n^{th}$ public key signed with the $n^{th}$ private key; and transmitting, by the $n^{th}$ party, the $n^{th}$ modified public key, where n is a natural number greater than 1, and when n=2, the first modified public key is the first public key signed with the first private key.

8 Claims, 18 Drawing Sheets

(51) Int. Cl.

| | |
|---|---|
| ***G05D 1/00*** | (2006.01) |
| ***G05D 1/69*** | (2024.01) |
| ***G05D 1/695*** | (2024.01) |
| ***G06Q 10/0832*** | (2023.01) |
| ***G06Q 20/22*** | (2012.01) |
| ***G06Q 20/32*** | (2012.01) |
| ***G06Q 20/38*** | (2012.01) |
| ***G06Q 20/40*** | (2012.01) |
| ***H04L 9/08*** | (2006.01) |
| ***H04L 9/14*** | (2006.01) |
| *G06Q 30/018* | (2023.01) |
| *H04L 9/00* | (2022.01) |

(52) U.S. Cl.

CPC ............... *G05D 1/69* (2024.01); *G05D 1/695* (2024.01); *G06Q 10/0832* (2013.01); *G06Q 20/227* (2013.01); *G06Q 20/321* (2020.05); *G06Q 20/3829* (2013.01); *G06Q 20/389* (2013.01); *G06Q 20/40145* (2013.01); *H04L 9/0825* (2013.01); *H04L 9/14* (2013.01); *H04L 9/3231* (2013.01); *H04L 9/3263* (2013.01); *H04L 9/3265* (2013.01); *B60L 2200/10* (2013.01); *G06Q 20/38215* (2013.01); *G06Q 30/018* (2013.01); *H04L 9/50* (2022.05); *H04L 2209/84* (2013.01)

(56) References Cited

U.S. PATENT DOCUMENTS 8,316,237 B1 11/2012 Felsher et al.
9,101,833 B2 * 8/2015 Behmaram-Mosavat ................... A63F 13/35
9,455,832 B2 * 9/2016 Brown .................. H04L 9/3242
10,681,038 B1 * 6/2020 Lambert ............... H04L 9/3226
10,776,522 B1 * 9/2020 McNeil ................. H04L 9/3247
11,184,172 B2 * 11/2021 Fuerstner ............ H04L 63/0853
11,558,178 B2 * 1/2023 O'Brien ............... G06Q 20/065
11,587,077 B2 * 2/2023 Wang .................... H04L 67/125
11,664,996 B2 * 5/2023 Choi ....................... G06F 21/33 713/175
12,021,850 B2 * 6/2024 Saint ..................... H04L 9/3228
2002/0066018 A1 * 5/2002 Linnartz ............... H04L 9/3226 713/171
2003/0115475 A1 * 6/2003 Russo ................... H04L 9/3231 713/186
2004/0172539 A1 9/2004 Herrewegen
2007/0198436 A1 8/2007 Weiss
2008/0065895 A1 * 3/2008 Liu ....................... H04L 9/3263 713/176
2008/0127279 A1 * 5/2008 Futa ...................... H04L 9/3297 725/80
2008/0167994 A1 7/2008 Li
2010/0131763 A1 * 5/2010 Kim ...................... H04L 9/3247 713/176
2013/0262858 A1 * 10/2013 Neuman ................... H04L 9/30 713/155
2013/0343545 A1 * 12/2013 Schiefelbein ......... H04L 63/062 380/278
2015/0172056 A1 * 6/2015 Meunier .................. G08G 1/04 380/28
2015/0269538 A1 * 9/2015 Stanchfield ........ G06Q 20/3676 705/71
2015/0312041 A1 * 10/2015 Choi ................... H04L 63/0861 713/175
2016/0127126 A1 * 5/2016 Sohn ..................... H04L 9/3073 713/171
2016/0294555 A1 10/2016 Jakobsson et al.
2017/0053458 A1 * 2/2017 Smith .................... G07B 15/00
2017/0169248 A1 * 6/2017 Darcy .................... G06Q 10/10
2017/0262789 A1 9/2017 Zhang et al.
2018/0167208 A1 * 6/2018 Le Saint ............... H04L 9/3265
2018/0184290 A1 * 6/2018 Luo ..................... H04L 63/0823
2018/0205743 A1 * 7/2018 Mclver ..................... H04L 9/14
2018/0261120 A1 * 9/2018 Shiomi .................... G09B 9/00
2019/0089546 A1 * 3/2019 Garcia Morchon .. H04L 9/0847
2019/0237176 A1 * 8/2019 O'brien ................. B64C 39/024
2019/0349201 A1 11/2019 Fuerstner
2019/0379536 A1 * 12/2019 Han ...................... H04L 9/3268
2020/0082361 A1 3/2020 Chan et al.
2020/0169460 A1 * 5/2020 Bartlett ................... H04L 67/12
2020/0313890 A1 10/2020 Mondello et al.
2020/0320527 A1 * 10/2020 Zhuang ................ G06Q 20/389
2022/0038291 A1 * 2/2022 Hong .................... H04L 9/3231
2023/0162182 A1 * 5/2023 Bartolucci ........... G06Q 20/389 380/282
2023/0396420 A1 * 12/2023 Badrinarayanan .... H04L 9/3247

FOREIGN PATENT DOCUMENTS

EP 1672832 A1 * 6/2006 ............... H04L 9/50
EP 1689143 A1 8/2006
EP 3288214 A1 2/2018
EP 3258660 B1 10/2018
JP 2005124097 A 5/2005
KR 20190124848 A 11/2019

OTHER PUBLICATIONS

IEEE, Ameur Manel et al., "Securing collaborative Web applications" (Re: XP 32272483A), 2012 International Conference on Education and e-Learning Innovations, Tunisia.
University of Maryland, Morselli Ruggero et al., "KeyChains: A Decentralized Public-Key Infrastructure" (Ref: XP 93203969A), 2006, USA.
Notification of the First Office Action dated Jun. 29, 2025from Chinese Application No. 202180069134.7.
Office Action dated Nov. 26, 2025 from United States U.S. Appl. No. 18/778,924.
Office Action dated Aug. 6, 2025 from U.S. Appl. No. 18/632,751.

* cited by examiner

| Public Key Certificate |
|---|
| Version Number<br>Serial Number<br>Signature Algorithm ID<br>Issuer Name<br>Validity period<br>Subject Name<br>Subject Public Key Info<br>Issuer Unique Identifier<br>Subject Unique Identifier |
| **Extension:**<br>Biometric code (OID, e.g., 1.2.410.200004.1.101.2)<br>Bar code / QR code / QR code + IoT code / UPC /RFID<br>URL / CRL<br>PUF<br>$GS_1$ / GSIN<br>IPv6<br>MAC<br>Crypto currency code<br>Cryptographic hash function address<br>Unique identity information or a combination of pieces of unique identity information<br>Blockchain code \| Blockchain information<br>Decentralized identifier (DID) information \| DID code<br>Central bank digital currency (CBDC) address<br>CBDC code \| CBDC hash value<br>Robot code \| Gesture code \| Drone code \| UAV code<br>AI code \| Speaker code<br>Connecting information (CI) code \| CI hash value<br>Duplicate information (DI) code<br>Identity information or ID wallet<br>Smart car key code<br>Healthcare code (relating to doctor, nurse, pharmacist, etc.)<br>Medical information code (relating to health conditions, physical fitness data, vaccination records, etc.)<br>Virtual identification code<br>Virtual property code<br>Metaverse code<br>Metaverse property code |

FIG. 1B

Meeting participant control

Key concept: Visual representation of the authentication status

"Visual representation" means: a number of rings, a color of rings, etc.

"Authentication status" means:

- Whether participation was pre-approved or not (participant | guest | invited | uninvited)
- Whether biometric code was verified (verification successful | not attempted | verification failed)
- Level of access to security information (top secret | secret | confidential | open)
- Platform of connection (computer | phone | terminal | wearable)
- Other status (infectious patient | hacker)

Means for rejecting a participant

- Other participants may vote out / level down
- Rejection based on behavioral analysis by AI

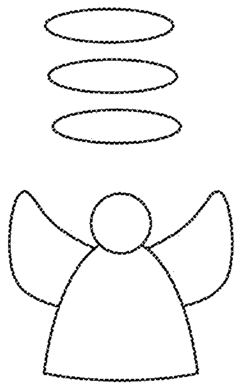

FIG. 9

CHAIN OF AUTHENTICATION USING PUBLIC KEY INFRASTRUCTURE

CROSS-REFERENCE TO RELATED APPLICATION

This application claims priority from U.S. Provisional Application No. 63/089,857 filed on Oct. 9, 2020 and U.S. Provisional Application No. 63/089,834 filed on Oct. 9, 2020. The aforementioned applications are incorporated herein by reference in their entireties.

TECHNICAL FIELD

The present disclosure relates to an authentication technique, and more particularly, to sequential authentication based on chain of authentication using public key infrastructure (PKI).

RELATED ART

In user authentication methods of the related art, a legitimate user is verified based on an ID, a password, or biometric data. However, an ID, a password, or biometric data are relatively easy to be lost, stolen, or intercepted during the transmission. Moreover, in the ubiquitous Internet of Things (IoT) environment, concerns for cyber-attacks or security breaches due to malicious codes being implanted in the IoT systems and metaverse platforms are increasing.

As an improvement, identity authentication methods based on public key infrastructure (PKI) has been developed. However, the PKI-based authentication methods of the related art authenticate users on one-on-one basis. Therefore, in services or transactions involving multiple parties, for example, in a smart city, virtual space, or metaverse environment, an increased number of certificates are required, and a need for a new method to increase system-wise security still exists.

SUMMARY

The terms "public key" and "private key," as used herein in the context of asymmetric cryptography or public-key cryptography, refer to a pair of corresponding mathematical terms, each pair consisting of what may be known to others (i.e., public key) and what may not be known to anyone except the owner (i.e., private key). The generation of such key pairs depends on cryptographic algorithms which are based on mathematical one-way functions. Herein, the terms "public key" and "private key" may also refer to files or digital containers that contain a public key or a private key along with, optionally, other information associated with the keys, which are formatted in syntax in accordance with a protocol such as public-key cryptography standards (PKCS).

The terms "sign," "digitally sign," "signature," "digital signature," and variations thereof, as used herein, relate to a mathematical scheme of asserting and verifying the authenticity of digital messages or documents, the scheme typically involving: generating a private key and a corresponding public key; encrypting a source message with a private key, and thus producing a "signature" or a "digital signature"; and decrypting the signature with the public key and verifying the source message to either accept or reject the message's claim to authenticity.

The term "code" and variations thereof, as used herein, mean: (i) a system of symbols used to represent information, which might originally have some other representation (e.g., ASCII, BER, country code, color code, Morse code, or the like); or (ii) a system of rules to convert information into another form, sometimes shortened or encrypted, for communication through a communication channel or storage in a storage medium.

The present disclosure provides methods of chain of authentication by sequentially authenticating multiple parties and generating modified public keys that include authentication information with different codes of all parties that have been previously authenticated using public key infrastructure (PKI). Aspects of the present disclosure provides improvement to the system-wise security in services or transactions involving multiple parties while minimizing the number of required PKI certificates. Further, in an extension field thereof, the PKI certificate may include a biometric code that points to or corresponds to biometric data or a combination of biometric data of a registered user, and thereby the PKI certificate may only be used when the biometric data or the combination of biometric data of the registered user is matched. Accordingly, the biometric-based security may be implemented at the certificate level, allowing the use of certificate to be more strictly controlled by its issuing authority.

According to an aspect of the present disclosure, a method for chain of authentication may include generating, by a first party, a first private key and a first public key corresponding to each other; transmitting, from the first party to a second party, the first public key signed with the first private key; generating, by the second party, a second private key and a second public key corresponding to each other; and generating, by the second party, a first modified public key that contains both the first public key signed with the first private key and the second public key signed with the second private key.

Any one or more of the following features may be included in any feasible combinations thereof. The method may further include transmitting, from the second party to a third party, the first modified public key; generating, by the third party, a third private key and a third public key corresponding to each other; generating, by the third party, a second modified public key that contains both the first modified public key and the third public key signed with the third private key; and transmitting, from the third party to the first party, the second modified public key. The method may further include verifying, by the second party, the received first public key signed with the first private key. The method may further include verifying, by the third party, the first modified public key. The method may further include verifying, by the first party, the second modified public key.

In particular, the first private key and the first public key may be generated by the first party based on a protocol defined in a first public key certificate in which a first code is inserted, and the second private key and the second public key may be generated by the second party based on a protocol defined in a second public key certificate in which a second code is inserted. The first code may correspond to or be associated with biometric data or a combination of pieces of biometric data of the first party, and the second code may correspond to or be associated with unique identity information or a combination of pieces of unique identity information of the second party. Further, the first code may further contain information corresponding to, associated with, and/or derived from an identity information (e.g., information stored in or associate with a driver's license, a passport, a permanent resident card, a health insurance card, an e-ID, a digital ID, decentralized identifier (DID), an ID wallet, etc.), electronic money, crypto-currency, smart car key, personal information (e.g., medical or healthcare information such as health conditions, physical fitness data, vaccination records, primary care physicians), virtual identification, information on premises or real estate on metaverse, or any combination thereof.

The first private key and the first public key may be generated by the first party based on a protocol defined in the first public key certificate in which a code corresponding to or associated with an Internet of Things (IoT) device is inserted. The first private key and the first public key may be generated by the first party based on a protocol defined in the first public key certificate in which an IoT code corresponding to or associated with a combination of biometric codes is inserted. The first private key and the first public key may be generated by the first party based on a protocol defined in the first public key certificate in which at least one of a code corresponding to or associated with a cryptographic hash function address, a code corresponding to or associated with a crypto currency, a code corresponding to or associated with digital cash, a code corresponding to or associated with central bank digital currency (CBDC), a code corresponding to or associated with blockchain, a code corresponding to or associated with a decentralized identifier (DID), a code corresponding to or associated with virtual identification, a code corresponding to or associated with property on metaverse, a code corresponding to or associated with premises on metaverse, or any combination thereof is inserted. The first private key and the first public key may be generated by the first party based on the first public key certificate in which a QR code or a code corresponding to or associated with the QR code is inserted. The first private key and the first public key may be generated by the first party based on a protocol defined in the first public key certificate in which a code corresponding to or associated with the QR code and an IoT code is inserted.

In some embodiments, the first party may order an item from the second party, and the third party may deliver the item from the second party to the first party. The first private key and the first public key may be generated based on a protocol defined in a first public key certificate in which a first code that corresponds to or is associated with biometric data or a combination of pieces of biometric data of a registered person and a code that corresponds to or is associated with a registered Internet of Things (IoT) device are inserted, the second private key and the second public key may be generated based on a protocol defined in a second public key certificate in which a second code that corresponds to or is associated with unique identity information or a combination of pieces of unique identity information of the second party is inserted, and the third private key and the third public key may be generated based on a protocol defined in a third public key certificate in which a third code that corresponds to or is associated with unique identity information of the third party is inserted. Further, the registered device may authenticate the third party in response to verifying the second public key. The first private key and the first public key may be generated based on a protocol defined in a first public key certificate in which a code corresponding to or associated with a registered identification data (e.g., e-ID, DID, digital ID on ID wallet, etc.) and/or a code associated with a registered payment method (e.g., bank account, crypto currency, digital cash, CBDC, virtual asset, electronic money on crypto wallet, virtual property on metaverse, cyber money wallet, etc.) are further inserted.

The first private key and the first public key may be generated based on a protocol defined in the first public key certificate in which at least one of a code corresponding to or associated with a cryptographic hash function address, a code corresponding to or associated with a crypto currency, a code corresponding to or associated with digital cash, a code corresponding to or associated with central bank digital currency (CBDC), a code corresponding to or associated with blockchain, a code corresponding to or associated with a decentralized identifier (DID), a code corresponding to or associated with virtual identification, a code corresponding to or associated with property on metaverse, or any combination thereof is inserted. In response to authenticating the third party, the registered device may perform a predetermined action to receive the item. The predetermined action may include opening a door (e.g., an entrance door to a room or a house), opening a trunk of a car, opening a trunk or a container of a delivery robot or a self-driving shuttle, opening a locked delivery box, allowing a use of a charging station, approving landing of a delivery drone, or any combination thereof. The predetermined action may also include removal of wrapping material, assembly of product, collection of old product, collection of wrapping material, presentation of instruction on product assembly and/or use, or any combination thereof. The predetermined action may be performed by an avatar, a hologram, or any combination thereof generated by a delivery robot.

According to another aspect of the present disclosure, a method for chain of authentication may include receiving, by an $n^{th}$ party, an $(n-1)^{th}$ modified public key from an $(n-1)^{th}$ party; generating, by the $n^{th}$ party, an $n^{th}$ private key and an $n^{th}$ public key corresponding to each other; generating, by the $n^{th}$ party, an $n^{th}$ modified public key that contains both the $(n-1)^{th}$ modified public key and the $n^{th}$ public key signed with the $n^{th}$ private key; and transmitting, by the $n^{th}$ party, the $n^{th}$ modified public key. Here, n is a natural number greater than 1, and for n=2, the first modified public key is the first public key signed with the first private key. The method may further include verifying, by the $n^{th}$ party, the $(n-1)^{th}$ modified public key. The structure of the modified public keys may be prescribed by the standards set forth by a certificate authority (CA), for example, by a multiple-signing or a cross-signing procedure defined by the PKI X.509 standard, a code-signing procedure defined by the public key cryptography standards (PKCS), or the like.

Notably, the present disclosure is not limited to the combination of the elements as listed above and may be assembled in any combination of the elements as described herein. Other aspects of the disclosure are disclosed herein.

BRIEF DESCRIPTION OF THE DRAWINGS

A brief description of each drawing is provided to more sufficiently understand drawings used in the detailed description of the present disclosure.

FIG. 1B is a schematic diagram of a public key certificate with a biometric code and a combination of various other codes are inserted according to an exemplary embodiment of the present disclosure;

FIG. 9 conceptually illustrates meeting participant control according to an exemplary embodiment of the present disclosure;

Figure 1A:
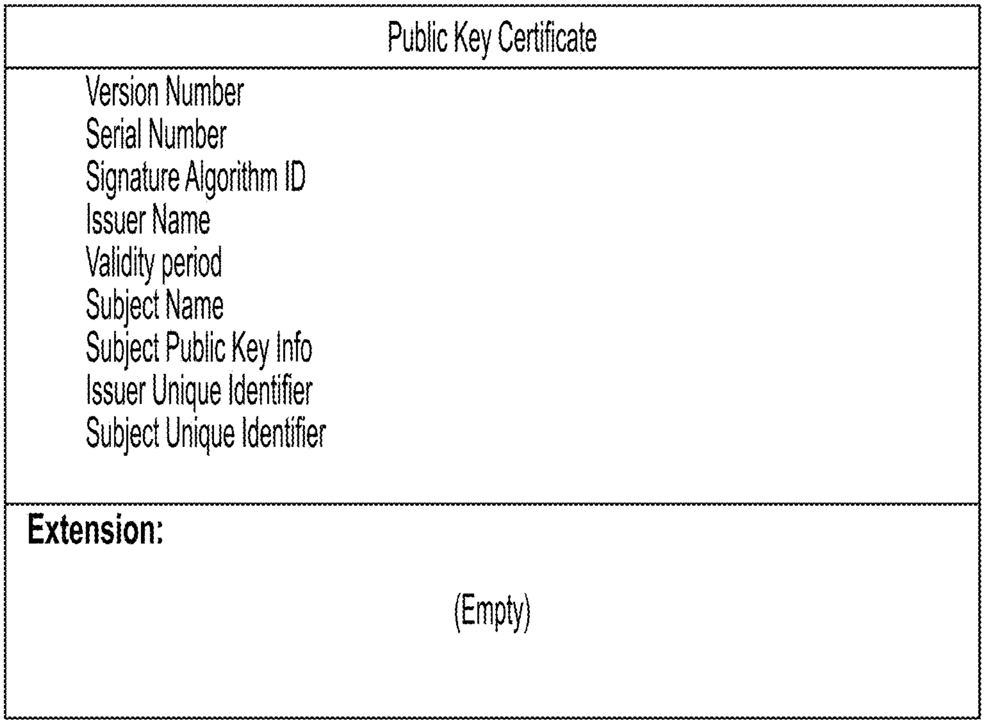
FIG. 1A is a schematic diagram of a public key certificate before an object identifier (OID) code such as a biometric code is inserted.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Advantages and features of the present disclosure and a method of achieving the same will become apparent with reference to the accompanying drawings and exemplary embodiments described below in detail. However, the present disclosure is not limited to the exemplary embodiments described herein and may be embodied in variations and modifications. The exemplary embodiments are provided merely to allow one of ordinary skill in the art to understand the scope of the present disclosure, which will be defined by the scope of the claims. Accordingly, in some embodiments, well-known operations of a process, well-known structures, and well-known technologies will not be described in detail to avoid obscure understanding of the present disclosure. Throughout the specification, same reference numerals refer to same elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Aspects of the present disclosure provides methods of sequential authentication based on chain of authentication using public key infrastructure (PKI) certificates. Compared to authenticating methods of the related art which are performed on one-on-one basis, the methods of chain of authentication using PKI according to the present disclosure may sequentially authenticate multiple parties and generate modified or registered public keys that include, in a single key, authentication information of all of the parties that have been previously authenticated. Accordingly, the system-wise security in services or transactions involving multiple parties may be improved while minimizing the number of required PKI certificates. Further, since the PKI certificate may include in an extension field thereof a biometric code that points to or corresponds to biometric data or a combination of biometric data of a registered user, the biometric-based security may be implanted at the certificate level, allowing the use of certificate to be more strictly controlled by its issuing authority.

Herein, the PKI certificates may be implemented and integrated with decentralized PKI (DPKI), blockchain PKI, hybrid PKI, or any combinations thereof. Decentralized identifiers (DIDs) can eliminate dependence on centralized registries for identifiers as well as centralized certificate authorities for key management, which is the standard in hierarchical PKI. In cases where the DID registry is a distributed ledger, each entity can serve as its own root authority. This architecture is referred to as decentralized PKI (DPKI).

Blockchain-based PKI uses the blockchain technology commonly associated with modern cryptocurrency. Since blockchain technology aims to provide a distributed and unalterable ledger of information, it has qualities considered highly suitable for the storage and management of public keys. Some cryptocurrencies support the storage of different public key types.

Malicious codes can be implanted in a network that connects drones, unmanned aerial vehicles (UAVs), self-driving vehicles, and/or robots, which require security. As a result, private information may be leaked or altered to cause a disruption of the system, and the intruder may acquire a control over the system. If a drone, UAV, self-driving vehicle, or robot that is infected with a malicious code connects to the network, a significant damage may result. For example, a self-driving vehicle may be remotely controlled to be used for terrorism or mass destruction, or medical (e.g., healthcare) equipment of a hospital can malfunction and pose a threat to patients' lives. Aerial vehicles such as a drone may make a hostile approach or deploy a bomb to an airport or an event site. As such, there is a need to defend the drones, UAVs, self-driving vehicles, or robots from falling into hostile hands and being used to deliver bombs, bio/chemical weapons, poisons, or the like.

In another aspect, drones, UAVs, self-driving vehicles, and/or robots are also used for various purposes, for example, to remote control or maintenance a facility that is difficult to access for humans, such as a dam or a nuclear powerplant, or to manage a traffic control system. In these applications, the drones, UAVs, self-driving vehicles, and/or robots communicate with devices or equipment in which Internet-of-things (IoT) devices are integrated using various sensors. These platforms are vulnerable to hacking, and accordingly, require improved authentication methods.

For the authentication, the recent trend is shifting from simpler authentication methods such as password-based methods to biometric-based methods in the field of e-commerce, fintech, cryptocurrency, or the like. However, various authentication methods are used for ordering, making payments, making or receiving deliveries, and there is no standard authentication method. Moreover, during the delivery, a product vendor, a deliverer, a customer, and/or any intermediate legs that are involved do not have a reliable means to authenticate one another. Accordingly, a more robust, consistent, and standardized method of biometric-based authentication is required. Further, when a threat or a suspicious activity is detected, a means to activate a cancel command (e.g., a "kill switch") by an authorized user or owner is needed.

In yet another aspect, during virtual meetings, on-line lectures, video conferences (e.g., Zoom, Google Meet, Microsoft Teams, etc.), or the like, if the meeting hosting system is compromised, or if the accounts of one or more participants are hacked, the entire meeting participants are exposed to fake or deceptive information, and may be misled to make inappropriate decisions, transactions, voting, or the like. Therefore, a means to authenticate the identity of participants based on biometric information of the participants with more robust multi-factor authentication is needed.

In view of the foregoing needs, the chain of authentication methods using public key infrastructure according to the present disclosure provide means to sequentially append codes to a private key. Herein, the codes may be designated for different purposes, such as a code associated with an IoT device, a code associated with blockchain, a code associated with blockchain information, a code associated with decentralized identifier (DID), a code associated with decentralized identifier (DID) information, a code associated with duplicate information (DI), a code associated with CBDC, a code associated with CBDC information, a code associated with CBDC hash value, a code associated with a robot, a code associated with a drone, a code associated with a UAV, a code associated with AI, a code associated with a speaker, a code associated with connecting information (CI), a code associated with a CI hash value, a code associated with medical (healthcare) information regarding a doctor, a nurse, a pharmacist, etc., a code associated with a smart car key, a code associated with virtual identification, a code associated with virtual property on metaverse, a code associated with premises on metaverse, or any combination of the foregoing.

FIG. 1A schematically shows a public key certificate before an object identifier (OID) code such as a biometric code is inserted. A certification authority (CA) may issue the public key certificate containing information governed by the CA (e.g., version, expiration date, algorithm, issuing institution, and the like). The certificates issued by the CA may contain the certificate policy extension populated with at least one policy OID. Inclusion of the policy OID may indicate that the certificate conforms to the standard set forth by the CA in the certificate policy (CP), certificate policy statement (CPS), certificate revocation lists (CRL), or the like. In some embodiments, the certificate may be a public key infrastructure (PKI)-based certificate, a private certificate, a blockchain certificate, an Internet-of-things (IoT) certificate, a decentralized identifier (DID) certificate, a CBDC certificate, or the like. The public key certificate may be issued to a user from a server of a root CA, a server of a subordinate CA, a server of a regional authority (RA), a cloud server, or the like. In some implementations, the certificate may be pre-installed in a safe area (e.g., IC chip, One Chip (IC, MCU, Se, PKI certificates, fingerprint sensor, etc.), secure element (SE), TEE, OS, CPU, memory, cloud SE, or the like) of a portable device, a smart device, a communication terminal, a smartcard, a wearable device, a smart watch, a smart band, a smart ring, AR glasses, a cloud terminal, a motion suite, a motion simulator, or a dongle at the time of designing or manufacturing a product or at the time of networking the product.

A public key certificate may be signed by the CA. In some embodiments, there may be multiple CAs. The root CA may authorize subordinate CAs to process the certificate transactions. In such embodiments, a public key certificate may be signed by multiple CAs (referred to as a cross-signing which will be further described later below). The signing procedure may be governed by the CA policy.

FIG. 1B schematically shows a public key certificate with a biometric code and a combination of various other codes are inserted according to an exemplary embodiment of the present disclosure. The public key certificate may be formatted in a predetermined structure based on the protocols of the PKI. In some embodiments, the public key certificate may have a format conforming to the International Telecommunication Union (ITU) X.509 standard, W3C standard, blockchain standard, DID standard, cryptocurrency standard, CBDC standard, or the like. However, the format of the public key certificate is not limited thereto, and the chain of authentication according to the present disclosure may utilize any standards for the public key certificate formats.

Referring to FIGS. 1A and 1B, a biometric code may be inserted in an extension field of the public key certificate. The biometric code may correspond to biometric data or a combination of pieces of biometric data of a legitimate user of the certificate. The biometric code may be formatted to identify an electronic object. In some implementations, the biometric code that is inserted in the extension field of the public key certificate may be a digital code such as an object identifier (OID) conforming to the ITU standard. The OID may represent a node that corresponds to a particular object. Examples of the OID may include Apple® certificate policy (1.2.840.113635.100.5.1), iPhone® software development signing (1.2.840.113635.100.6.1.2), client authentication (1.3.6.1.5.5.7.3.2), or the like. For example, node 1.2.410.200004.1.101.2 may indicate 1 (iso), 2 (member body), 410 (Republic of Korea), 200004 (Korea Internet & Security Agency), 1 (algorithm), 101 (encryption algorithm), and 2 (encryption based on finger-print biometric) and may point to biometric data or a combination of pieces of biometric data of different PKI policies associated with different purposes. However, the biometric code is not limited to the OID, and the biometric code of the present disclosure may be implemented as various other formats that correspond to biometric data or a combination of pieces of biometric data based on a predetermined standard used in a network for chain of authentication.

In some implementations, the biometric data or the combination of pieces of biometric data may include biometric templates. In some implementations, the biometric data or the combination of pieces of biometric data may include encrypted biometric templates or encrypted biometric data. By way of example, the biometric data or the combination of pieces of biometric data may include heartbeat, DNA, eye tracking, sign language, sign language dance, body language, single or multi-finger pointing, hand-written signature, designed gesture, drawing gesture, one or more persons' combination of two hand gesture, fingerprint sensory device tapping, finger-mounted device free gesture, single- or multi-fingertip node action, or the like. The biometric data that may be utilized is not limited thereto.

The biometric data or the combination of pieces of biometric data may be stored in a secure storage or a secure element. In some embodiments, the biometric codes may be merged or concatenated from a plurality of pieces of different biometric data of the user, and the merged biometric codes may be inserted in a certificate. For example, a combination of different types of biometric data, such as fingerprint and iris, face and voice, heartbeat and iris, or a combination of similar types of biometric data, such as fingerprint 1 (e.g., right thumb) and fingerprint 2 (e.g., right index finger), or iris 1 (right) and iris 2 (left), or fingerprint 1 (e.g., right thumb) and iris 2 (left) may be used. Further, any of the above-mentioned biometric data or other biometric data may be combined in any feasible manners. When a combination of a plurality of pieces of biometric data is used, an order of inputting the biometric data may be added as an additional authentication element. In some embodiments, different pieces of biometric data or different combinations of pieces of biometric data of the user may be inserted in different public key certificates.

Further referring to FIG. 1B, the extension filed of the public key certificate may include additional codes. In some implementations, the additional codes may include at least one code associated with unique identity information or a combination of pieces of unique identity information. For example, the codes may be associated with a bar code, a QR code, a QR code combined with an IoT code, a universal product code (UPC), a RFID, a URL, a CRL, a physically unclonable function (PUF), a GS1, a global shipment identification number (GSIN), an IPv6 address, a MAC address, a cryptographic hash function address, crypto currency, digital cash, central bank digital currency (CBDC), or the like.

With the codes inserted in the extension field of the public key certificate, a corresponding pair of a private key and a public key may be generated based on the algorithm specified in the public key certificate such as, for example, the ITU X.509 standard with respective CA policy, blockchain CA policy, DID CA policy, CBDC CA policy, and the like. According to the present disclosure, each party involved in the chain of authentication may generate its own pair of a private key and a public key. For example, a first party may generate a first private key and a first public key corresponding to each other, and a second party may generate a second private key and a second public key corresponding to each other. Similarly, a third party may generate a third private key and a third public key corresponding to each other. The private keys may be stored privately in a secured storage or a secure element of each party. The public keys may be shared or distributed publicly among the network for chain of authentication to each authentication server or cloud server involved.

Figure 2:
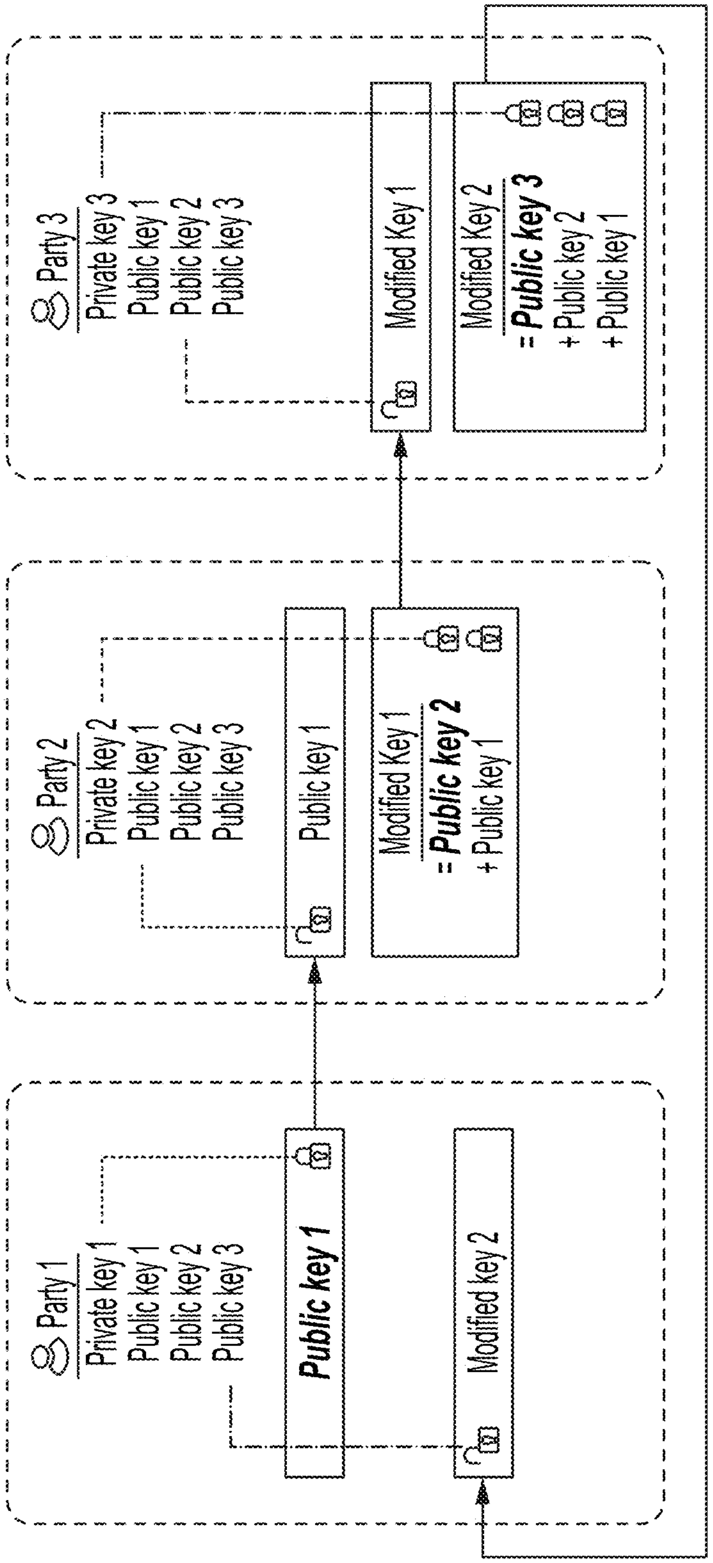
FIG. 2 is a flow chart illustrating a circular chain of authentication between three parties according to an exemplary embodiment of the present disclosure.

FIG. 2 illustrates an example of a circular chain of authentication between three parties according to the present disclosure. Referring to FIG. 2, each party may share (e.g., distribute or "register") the public key among the network of involved parties. The public key sharing may be performed during a registration process for each service request. To initiate the chain of authentication, the first party may transmit a first public key signed with the first private key to the second party. Here, the first public key and the first private key may belong to the first party. The transmission by the first party to the second party may be performed in response to the second party requesting service authentication from the first party.

In order for the first party to be able to send the first public key signed by the first private key, a device of the first party may verify the identity of a person who is attempting to use the device. For this purpose, the device may include a biometric sensor, a biometric data matching component, a biometric storage component, and/or a biometric secure component. The biometric sensor may include a fingerprint sensor, an iris pattern sensor, a voice recognition sensor, a vascular pattern sensor, a palm recognition sensor, a gesture sensor, a finger-mounted sensor, a finger ring sensor, a fingertip sensor, a finger gesture sensor, an air finger gesture sensor, or the like. Using the biometric sensor thereof, the device may acquire biometric data or a combination of pieces of biometric data of the person who is attempting to use the device. Subsequently, the biometric data matching component of the device may compare the acquired biometric data or the combination of pieces of biometric data of the person who is attempting to use the device with biometric data or the combination of pieces of biometric data that is stored within the biometric storage component (e.g., secure element) of the device. If the acquired data and the stored data do not match, the device may reject the person from transmitting the first public key signed with the first private key. Only when the acquired biometric data or the combination of pieces of biometric data match, the device may transmit the first public key after signing it with the first private key.

The biometric data or the combination of biometric data of each party may be acquired and stored within the biometric storage component (e.g., secure element) during the registration process of each party. During the registration process, an administrative body of the service may store the biometric data or the combination of biometric data of the party after verifying the identity of the party to be registered as the legitimate user of the device or the legitimate owner of the public and private keys. In some embodiments, data within the biometric storage component (e.g., secure element) may be written and/or altered only by the administrative body of the service. In some embodiments, the biometric data or the combination of pieces of biometric data may be stored remotely, instead of within the device, for example in a cloud server. Furthermore, the biometric data or the combination of biometric data of the registered first party may be encrypted and stored such that even the administrative body of the service may be unable to acquire the raw data.

The biometric storage component (e.g., secure element) may store a plurality of biometric information of the registered party. For example, when storing the fingerprint information as the biometric data, the fingerprint of each finger may be stored. When storing the iris pattern as the biometric data, the iris patterns of both eyes may be stored. In particular, since the pair of private and public keys includes the biometric code (e.g., OID) in the extension field thereof, the correct biometric data or the correct combination of pieces of biometric data may be identified and compared based on the biometric code inserted in the keys. For example, when a person scans a fingerprint, since the biometric code in the key can point to which biometric data should be matched, the scanned fingerprint may be verified against the correct fingerprint data of the registered party prescribed in the keys among the plurality of biometric data. Moreover, even when a plurality of public keys and/or a plurality of private keys are stored, a key (or a pair of public and private keys) that includes the biometric code that corresponds to fingerprint may be selected, and the fingerprint data may be matched based on the biometric code of the selected key. Accordingly, the security of the certificate and the pair of public and private keys based thereon may be improved because the biometric-based security is implemented at the certificate level, not at the device level. Unlike the authentication methods in the related art that transmit a public key signed with a private key after validating biometric data at the device front-end or by an operating system (OS) of the device or at the application level, the certificates used in the methods of the present disclosure may embed the biometric-based security at the certificate level. Therefore, even if a user may be authenticated by the device or the OS, the public key or the authentication information may be signed with the private key only if the user is verified to be a legitimate owner of the certificate. In other words, the certificate itself may dictate which and/or how the biometric data should be used in order to be authorized to use the public and private keys generated from the certificate.

As described above, in some embodiments, different pieces of biometric data or different combinations of pieces of biometric data of the registered party may be inserted in different public key certificates. The pairs of public and private keys generated from the different public key certificates may be used for different purposes. For example, one public key certificate with a biometric code corresponding to one finger may be used for a purpose of ordering, and another public key certificate with a biometric code corresponding to another finger may be used for a purpose of canceling. Depending on the different purposes, the public key certificates may cause the device to take different actions in accordance with the designated purposes of the keys. For example, a particular fingerprint, a particular combination of fingerprints, or a particular combination of fingerprint and iris, etc. may be designated for an emergency purpose, and when the particular fingerprint is scanned and matched, the device may send an emergency signal to a police station and report that the party is under a threat or duress.

In some embodiments, in response to the particular fingerprint being scanned and matched, the device may be configured to cancel, recover, or reset a command. Herein, canceling may mean requesting an unprocessed command not to be processed (e.g., vacating a command before it is processed), recovering may mean returning to the immediate previous state before the command after the command has been processed (e.g., undoing the effects of a processed command), and resetting may mean returning to a preset initial state.

In some embodiments, a public key certificate may correspond to a kill public key that, when used, may force a drone, a vehicle, or a robot to halt or stop operation. In such embodiment, the drone, the vehicle, or the robot may be commanded to park at a preset location or return to the base station (RTB). In some such embodiments, the drone, the vehicle, or the robot may be commanded to stand-by at a preset location. The preset location may include, but not limited to, a parking lot, a garage, a shoulder of a road, a charging station, or the like. The drone, the vehicle, or the robot may wait for further instructions in a stand-by mode.

In some embodiments, the kill public key may be activated when it is determined that continued operation of the drone, the vehicle, or the robot would pose a threat to public safety due to, such as, a hacking, hijacking, malfunction, or failure. In some embodiments, the activation of the kill public key may command the drone, the vehicle, or the robot to destroy itself. The self-destruction may be conducted at a predetermined safe location.

In some embodiments, various public keys for different purposes may be implemented to hide or delete different portions of or entire data from the Internet, virtual space, metaverse, social media, online games, or online accounts. In other words, a user may designate different public keys to specify which content is to be visible and which content is to be hided when a particular public key is used. For example, when a person dies, a surviving family member or the like may utilize a public key to retrieve data of the deceased. However, the public key, when used, may hide or delete some portions of the data, which the deceased pre-designated.

In some embodiments, when a wearable smart device determines that its wearer has died based on, for example, collected bio-signals such as heartrate or any emergency health data, a public key may be activated such that certain data are forwarded to a predetermined address or URL. By way of example, the data may be a legacy from the deceased, or data that testify the circumstances of the death. In some implementations, the data may serve constructive execution of a will where the deceased has died otherwise intestate.

In the event of one's death or when one undergoes a critical surgery, under some circumstances, one may desire to hide from others private information such as purchase records, delivery records, gifting records, and personal activities such as the Internet use, virtual space activities, social media activities, metaverse activities, in-game activities, and text messages, which have been performed using smartphones and/or terminals. Examples include a romantic relationship one wants to hide, history of gifts or money-transfer to a lover, and related emails, text messages, documents, etc.

In some embodiments, signing with the biometric signature for a legacy signature purpose may be submitted as evidence, and if there is a designated format, the biometric signature may qualify as additional data in digital print format and multi-signing such as CA certificate in connection with the biometric authentication, manual signature, or any combinations thereof.

Under some circumstances, various private information, photographs, and social media records may be disclosed when one's smartphone or terminal is stolen or lost. In such cases, others, such as hackers or criminal organizations, may attempt to use the information without permission and maliciously. To avoid such situations, a public key may be designated for a function of erasing data, formatting data and/or destroying the device. The public key with such a function may be implemented similarly as a kill switch function in the PKI certificate as described above.

In some embodiments, one may desire to disclose certain aspects of personal life after death to family, friends, colleagues, etc., or use voice, text, or movie for a purpose of a will or various other purposes, and may designate related activities to be recorded and then stored separately. These records may hide certain types of activities in advance, and a predetermined action associated with biometric authentication for those purposes may be designed and registered during the biometric registration process. In some such embodiments, even the activities that are designated to be hidden may be disclosed under some limited circumstances, for example, for court use or legal services purpose, forensics, computer forensics, and the like.

In some embodiments, upon death, one may designate in advance a predetermined time period for restoring at least some information. An alarm may automatically appear on the smartphones or terminals so that an heir, an executor, or a family member, who meets the prerequisites conditions such as maintaining the power of the smartphones or terminals for a certain period of time, may obtain access rights to the information by means of various authentication methods such as password notified by the device of the deceased or biometric authentication from a pre-designated person. As described above, the password may appear automatically on the smartphones or terminals after the predetermined time period has elapsed.

In various examples described herein, once the first public key signed with the first private key is transmitted to the second party after the biometric data or the combination of pieces of biometric data of the first party is successfully matched, the second party may verify the received first public key signed with the first private key. For the verification, the second party may use the first public key that belongs to the first party and has been previously shared. In response to successfully verifying or authenticating the first party, the second party may generate a first modified public key. To generate the first modified public key, the second party may concatenate the second public key signed with the second private key and the received first public key signed with the first private key. Consequently, the first modified public key may include the first public key and the second public key signed with the first private key and the second private key, respectively.

In some embodiments, the second party may generate the first modified public key by signing the first public key that has been signed with the first private key with the second private key. In other words, the first public key may be signed by the first party with the first private key and subsequently signed by the second party with the second private key.

At this phase, the first modified public key may indicate that the identity of the first party has been authenticated by the second party. If the second party cannot authenticate the first public key, the chain of authentication may fail, and further procedure may be terminated.

In the above example, upon the request by the second party for the authentication, the first party transmits the first public key signed with the first private key. However, the present disclosure is not limited thereto. Alternatively or additionally, the first party may transmit other authentication information that is signed with the first private key. Throughout the present disclosure, transmitting a public key signed with a private key may also refer to transmitting any authentication information signed with a private key. The authentication information may include an ID, a password, OTP, or any other information that may represent the identity of the party. In addition, when the public key or the authentication information is signed with the private key, a device may verify a person who is attempting to transmit the information based on biometric data or a combination of pieces of biometric data that is stored within a biometric storage component (e.g., secure element or SE) of a device of each party or within a cloud server. As described above, each party involved in the service may be required to register at the administrative body after verifying its identity, and the administrative body may store the biometric data within the device of each party.

The second party may transmit the first modified public key to the third party. Similar to the procedure described above, the third party may generate a second modified public key after verifying or authenticating the second party. More specifically, the third party may verify the received first modified public key. In verifying the first modified public key, the third party may use the second public key of the second party that belongs to the second party and has been previously shared.

In response to successfully verifying or authenticating the second party, the third party may subsequently generate a second modified public key. Similar to the first modified public key, the second modified public key may be generated by concatenating the first modified public key and the third public key signed with the third private key. If the third party cannot authenticate the second public key, the chain of authentication may fail, and further procedure may be terminated. In some implementations, the third party may also authenticate the first party based on the first public key that belongs to the first party and has been previously shared. However, since the identity of the first party has been already authenticated by the second party, the third party may trust that the identity of the first party has been authenticated without separately authenticating the first party again.

At this phase, the second modified public key may include the first public key, the second public key, and the third public key each signed with the first private key, the second private key, and the third private key, respectively, all concatenated in a single public key form. The generation of the second modified public key may indicate that the identity of the first party and the identity of the second party have been sequentially verified. When the chain of authentication according to the present disclosure involves more than three parties, the third party may transmit the second modified public key to a fourth party, and similar sequential chain of authentication may proceed subsequently.

When the chain of authentication according to the present disclosure involves three parties, the third party may transmit the second modified public key to the first party. Subsequently, the first party may verify the second modified public key based on the third public key that belongs to the third party and has been previously shared. Additionally or alternatively, the first party may authenticate both the third party and the second party based on the third public key and the second public key that have been previously shared. Furthermore, the first party may also verify the first public key signed with the first private key (i.e., its own authentication information and/or code stored in the modified public key). As such, the first party may confirm that the third party can be trusted and may legitimately carry an item, an article, information, or the like that itself (i.e., the first party) requested to the second party.

The above-described three-party model of the circular chain of authentication according to the present disclosure may be embodied in a scenario involving a buyer, a service provider (e.g., a seller, a vendor, a hotel, a restaurant, a delivery service provider, an IoT render, or the like), and a deliverer (e.g., a robot, a drone, a UAV, a self-driving car, or the like). Here, the first party may correspond to the buyer (e.g., a person who orders an item using a terminal and/or with a voice order through an AI speaker, MR/AR glasses, smart watch, smart wearable band, motion suite, motion simulator, or smart ring), the second party may correspond to the seller, and the third party may correspond to the deliverer (e.g., a person or a platform that delivers an ordered item from the seller to the buyer). More specifically, when the buyer, the seller, and the deliverer are registered within a service network, the buyer may order an item from the seller. During the ordering process, the seller may request authentication from the buyer. In response to such request, the buyer may transmit a buyer public key signed with a buyer private key. The seller may verify the buyer based on the buyer public key that has been shared or registered previously. Upon successful verification, the seller may assign and summon a deliverer.

Subsequently, the seller may request authentication from the deliverer. Upon such authentication request, the deliverer may transmit a deliverer public key signed with a deliverer private key. The seller may verify the deliverer based on the deliverer public key that has been shared or registered previously. Upon successful verification, the seller may transfer the ordered item to the deliverer. Along with the ordered item, the seller may transmit the first modified public key that includes the buyer public key and the seller public key each signed with the buyer private key and the seller private key, respectively, to the deliverer. The deliverer may generate a second modified public key that includes the buyer public key, the seller public key, and the deliverer public key signed with the buyer private key, the seller private key, and the deliverer private key, respectively.

The deliverer may transfer the ordered item to the buyer. Upon arrival, the deliverer may request authentication from the buyer. Upon the authentication request, the buyer may transmit the buyer public key signed with the buyer private key to the deliverer. The deliverer may verify the buyer based on the buyer public key that has been shared or registered previously.

The buyer may request authentication from the deliverer as well. To such request, the deliverer may transmit the second modified public key to the buyer. The buyer may verify that the second modified public key includes all of the buyer public key, the seller public key, and the deliverer public key each signed with the buyer private key, the seller private key, and the deliverer private key, respectively, and may confirm that the item that the deliverer carries can be trusted and considered what the buyer itself ordered from the seller.

In some embodiments according to the present disclosure, the buyer may order an item using a smart device. The smart device that can be used in the exemplary embodiments may include a smart speaker, an AI speaker, an autonomously-driving car, a robot, a drone, augmented reality (AR) glasses, a central controller at home/office/factory, a smart phone, a home-automation system, a household robot, a computer, a terminal, a smart watch, a smart ring, a smart band, a single or multi-gesture device, an HMD, or the like. However, the present disclosure is not limited thereto, and any devices, apparatus, or systems, whether or not dedicated for the chain of authentication network, may be used.

When the buyer orders an item via a smart device, the smart device may store a pair of a first private key and a first public key that correspond to each other. In particular, the first private key and the first public key may be generated based on a first public key certificate in which a code associated with a biometric code and/or an Internet of Things (IoT) device (i.e., an IoT code) is inserted. Further, the pair of the first private key and the first public key may be generated based on a first public key certificate in which both a unique code of the smart device and a unique code of a registered user of the smart device are inserted. In some embodiments, the unique code of the smart device may correspond to an Internet of Things (IoT) code, and the unique code of the registered person may correspond to biometric data or a combination of pieces of biometric data of the registered person. In some implementations, the IoT code may be based on a physically unclonable function (PUF) of an integrated circuit (IC), a CPU, One Chip (e.g., IC, MCU, SE, PKI certificates, fingerprint sensors, etc.) disposed within the smart device.

In such exemplary embodiment, a person that is registered or authorized to use the smart device (e.g., a smart speaker or an AI speaker) may order an item using the person's own voice, and the smart device may verify the voice of the person based on the biometric code inserted in the first public key stored in the smart device. Upon successful verification, the smart device may place an order to the seller. In this step, the smart device may transmit the first public key signed with the first private key. As described above, the first public key and the first private key may include both the biometric code of the registered person and the IoT code of the smart device.

Since the first public key has been previously registered to the seller, the seller may verify the first public key signed with the first private key based on the first public key that belongs to the buyer (i.e., a combination of the registered person and the smart device) and has been previously shared with the seller. Again, as described above, in lieu of the first public key signed with the first private key, other authentication information signed with the first private key may be transmitted for the authentication of the buyer. The authentication information may include an ID, ID data, a decentralized ID (DID), a blockchain ID, a digital ID on an ID wallet at a terminal or a smart phone or a biometric card, a password, or any other information that may indicate the identity of the buyer.

In some embodiments, the second private key and the second public key of the seller may be generated based on a second public key certificate in which a second code is inserted. The second code may correspond to unique identity information of the seller. For example, the unique identity information of the seller may include an Internet Protocol (IP) address, a MAC address, a PUF, location information, GPS data, cellular tower information, any combination thereof, or the like According to the exemplary embodiment involving a smart device or a terminal, the smart device may verify the identity of the deliverer upon receiving the delivery. In some embodiments, the smart device or the terminal may perform a predetermined action to receive the delivered item upon authenticating the deliverer. For example, the smart device or the terminal may open a door, a trunk of a car, a trunk or a container or a storage compartment of a delivery robot or a self-driving shuttle, a locked delivery box, a mailbox, or the like. Additionally or alternatively, the smart device or the terminal may notify the person who has been registered to use the smart device or the terminal that the deliverer arrived, and may request an instruction from the registered person. The registered person may instruct the smart device or the terminal to open a door with a code or a modified public key, a trunk of a car with a smart car key code or a modified public key, a trunk or a container or a storage compartment with a container security device (CSD) of a delivery robot with a robot key code or a modified public key, a trunk or a container or a storage compartment with a CSD of a self-driving shuttle with a key code or a modified public key, a locked delivery box, a mailbox, a post box, an elevator, a (common-access) gate of a condo, a (common-access) gate of an apartment, a gate of a parking lot, a garage door, or the like having a same logic; to approve (and/or guide) landing of the delivery drone; or to give a specific instruction to the deliverer such as to place the item at a specific location (e.g., a back-porch of the house), to deliver it to another location (e.g., to a workplace or to another party), and to reject the delivery.

To receive a new instruction from the buyer via the smart device or the terminal, the deliverer may further confirm the authenticity of the person who gives the new instruction by requesting the first public key signed with the first private key and verifying it based on the first public key stored in the second modified public key. In an exemplary embodiment involving delivering the item to another party (i.e., a fourth party), the fourth party may be required to have been previously registered to the chain of authentication network. As such, the deliverer may verify the identity of the fourth party, and the fourth party may trust the deliverer based on the modified public key in which all of the public keys are signed with the legitimate private keys along the sequential chain of authentication according to the present disclosure.

Figure 3:
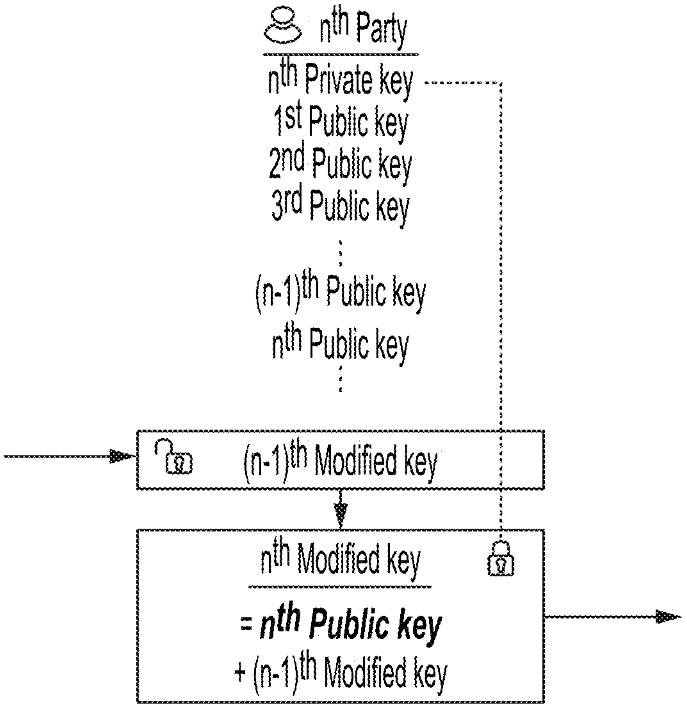
FIG. 3 is a flow chart illustrating a general representation of a chain of authentication according to an exemplary embodiment of the present disclosure.

Generally, the number of parties involved in the sequential chain of authentication according to exemplary embodiments of the present disclosure is not limited. FIG. 3 illustrates a general representation of a chain of authentication according to an exemplary embodiment of the present disclosure. Referring to FIG. 3, a method for chain of authentication performed by an $n^{th}$ party, where n is a natural number greater than 1, according to an exemplary embodiment of the present disclosure may include receiving an $(n-1)^{th}$ modified public key from an $(n-1)^{th}$ party, and verifying the $(n-1)^{th}$ modified public key based on an $(n-1)^{th}$ public key that belongs to the $(n-1)^{th}$ party and has been previously shared. The $n^{th}$ party may previously generate an $n^{th}$ private key and an $n^{th}$ public key that correspond to each other.

In response to successfully authenticating the $(n-1)^{th}$ party, the $n^{th}$ party may subsequently generate an $n^{th}$ modified public key by concatenating the $(n-1)^{th}$ modified public key and the $n^{th}$ public key signed with the $n^{th}$ private key. The $n^{th}$ modified public key may then be transmitted to an $(n+1)^{th}$ party or to any one of the $1^{st}$ to $n^{th}$ party.

In some embodiments, the $n^{th}$ party may generate an $n^{th}$ modified public key by signing an $(n-1)^{th}$ modified public key with an $n^{th}$ private key. In these embodiments, the $n^{th}$ modified public key may have a structure where the first public key is sequentially signed by the first private key, the second private key, the third private key, and so on, up to the $n^{th}$ private key. Here, each party may sign the immediate prior modified public key with its own private key after authenticating the identity of the immediate prior party. For authentication, any methods described throughout the present disclosure may be used.

In some embodiments, the $n^{th}$ party may generate an $n^{th}$ modified public key by signing an $(n-1)^{th}$ modified public key with an $n^{th}$ private key, where the $(n-1)^{th}$ modified public key includes two or more public keys signed with the corresponding private keys and then parallelly concatenated. For example, the $2^{nd}$ modified public key may include the $1^{st}$ public key signed with the $1^{st}$ private key and the $2^{nd}$ public key signed with the $2^{nd}$ private key, where the $1^{st}$ and $2^{nd}$ public keys each signed with its corresponding private key are parallelly concatenated. A $3^{rd}$ modified public key may be subsequently generated by signing this $2^{nd}$ modified public key with a $3^{rd}$ private key.

Any combinations of the above-described embodiments are also possible. For example, a $3^{rd}$ modified public key may have a structure where a $1^{st}$ public key sequentially signed with a $1^{st}$ private key and a $2^{nd}$ private key (i.e., $2^{nd}$ modified pubic key), and a $3^{rd}$ public key signed with a $3^{rd}$ private key are parallelly concatenated. The $4^{th}$ party may generate a $4^{th}$ modified public key by signing the $3^{rd}$ modified public key with a $4^{th}$ private key.

Herein, the description has been given for the examples where the parties sign their public keys with their corresponding private keys. However, the present disclosure is not limited thereto, and any information, data, or messages to be used for authentication between the parties may be signed with their own private keys. By way of example, the first party may sign any message, which has been previously shared with the second party, with its private key. The second party may verify the signed message received from the first party based on the public key of the first party. The message may be previously shared between the parties, or generated by the second party and sent to the first party for the verification purpose. This message that the second party sends to the first party may be referred to as a “challenge,” and the message signed with the private of the first party may be referred to as a “response.”

Figure 4:
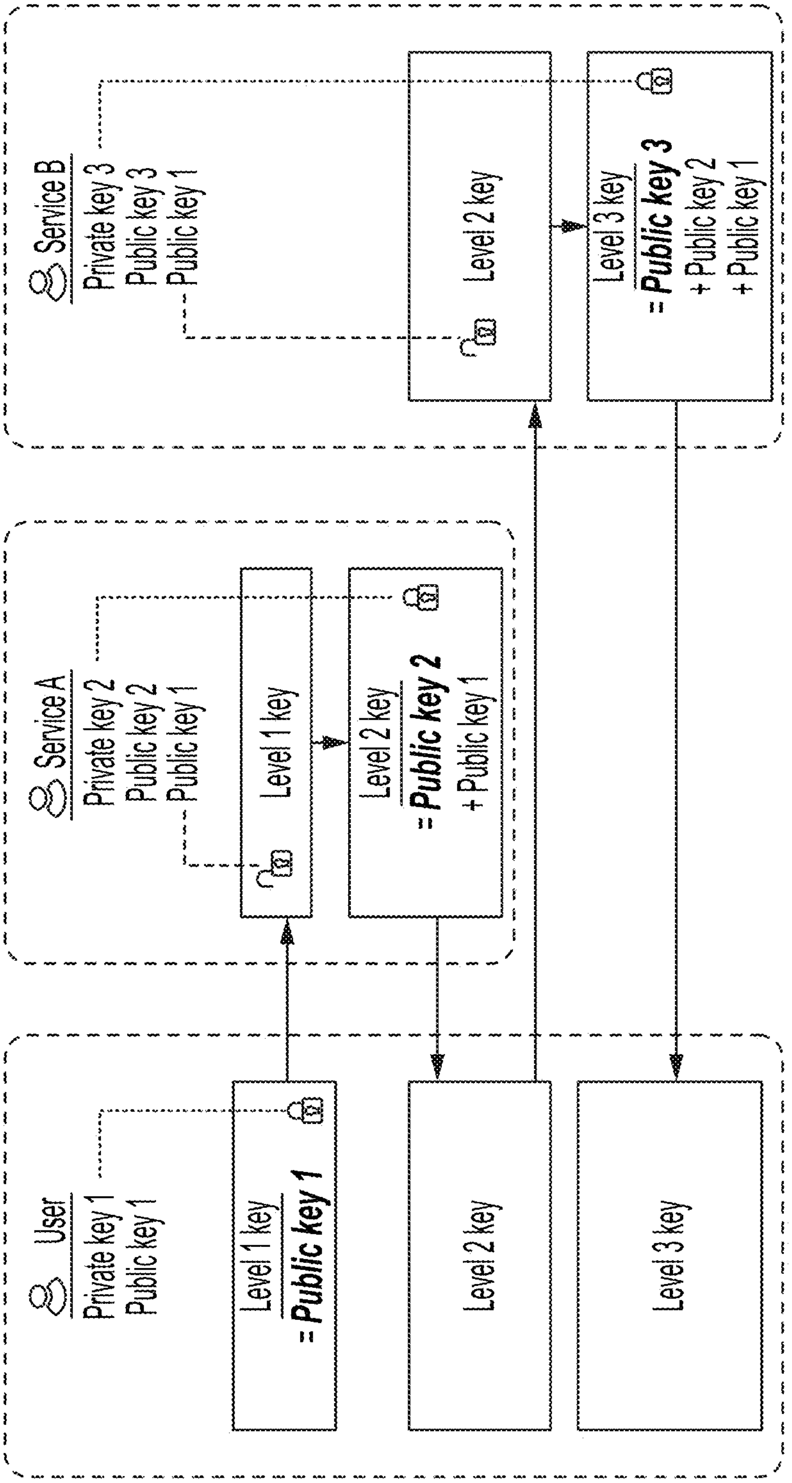
FIG. 4 is a flow chart illustrating a level of key increasing based on chain of authentication according to an exemplary embodiment of the present disclosure.

Hereinbelow, an exemplary embodiment involving a level of authentication according to the present disclosure will be described. FIG. 4 illustrates a concept of level of key increasing based on chain of authentication according to an exemplary embodiment of the present disclosure. Referring to FIG. 4, a network of service providers and users (e.g., service subscribers) may be provided, and each member of the network may generate a pair of a private key and a public key corresponding to each other. The public keys of the registered users may be previously shared or registered among the service network.

Subsequently, in order for a user of the service network to obtain a higher-level key, the user may transmit the first public key signed with the first private key to a first service provider who provides Service A. The first service provider may verify the received first public key signed with the first private key based on the first public key that belongs to the user and has been previously shared. In response to authenticating the user, the first service provider may generate a level 2 key by concatenating the first public key signed with the first private key and a second public key signed with a second private key. Here, the pair of the second private key and the second public key may belong to the first service provider. The first service provider may then transmit the level 2 key back to the user. At this phase, the user may obtain the level 2 key that enables the user to use Service A provided by the first service provider.

The user may further increase the level of key by sending the level 2 key to a second service provider who provides Service B. When the second service provider authenticates the user, the second service provider may generate a level 3 key by concatenating the level 2 key and a third public key signed with a third private key. Here, the pair of the third private key and the third public key may belong to the second service provider. The second service provider may then return the level 3 key to the user. At this phase, the user may obtain the level 3 key that enables the user to use both Service A and Service B.

Generally, a number of the levels of the key according to exemplary embodiments of the present disclosure is not limited. A method of chain of authentication involving a level of key according to an exemplary embodiment of the present disclosure may include a user generating a first private key and a first public key corresponding to each other. As described above, each of the service providers may generate a pair of a private key and a public key corresponding to each other. For example, an $n^{th}$ service provider may generate an $n^{th}$ private key and an $n^{th}$ public key corresponding to each other. In order for the user who possesses a level n key to obtain a level (n+1) key, where n is a natural number, the user may transmit the level n key to the $n^{th}$ service provider.

The $n^{th}$ service provider may verify the received level n key based on the first public key that belongs to the user and has been previously shared. Upon authenticating the user, the $n^{th}$ service provider may generate the level (n+1) key by concatenating the level n key and the $n^{th}$ public key signed with the $n^{th}$ private key, and may transmit the level (n+1) key to the user. When n=1, the level 1 key may be simply the first public key signed with the first private key.

In some embodiments, the $n^{th}$ service provider may generate the level (n+1) key by signing the level n key with the $n^{th}$ private key. In these embodiments, the level (n+1) key may have a structure where the first public key is sequentially signed by the first private key, the second private key, the third private key, and so on, up to the $n^{th}$ private key. Here, each service provider may sign with its own private key the prior level key after authenticating the identity and/or authorized rights of the immediate previous party/service provider. For authentication, any methods described throughout the present disclosure may be used.

As described above, in some embodiments, the level (n+1) key may include any information, data, or messages that are mutually shared between the parties instead of, or in addition to, the first public key. In such embodiments, the information, data, or messages that are mutually shared may be sequentially signed by one or more private keys.

According to the present disclosure, the level of key that a user possesses may be proclaimed to all or part of other members of the network, for example, in virtual meeting with virtual reality (VR), augmented reality (AR), and/or mixed reality (MR), or in network games, virtual open house, virtual factory, virtual exhibition/conference, virtual shopping with an avatar, metaverse, or the like. In other words, other members of the service network may know or recognize the level of key that the user possesses and provide services based on the level of key that the user possesses. In some embodiments, the service network may be implemented in a cyber space such as the VR, AR, MR, and the like. In such embodiments, the level of key that the user possesses may be proclaimed to all or part of other members of the cyber space, and the level of the key that a user possesses may be visually displayed on a virtual representation of the user. The virtual representation of the user may include an emoticon, a memoji, a hologram, an avatar, sign language dace, or the like. However, the virtual representation of the user that may be used with the level of the key according to the present disclosure is not limited thereto. Any still images or moving images, 2-dimensional or 3-dimensional, or the like that can represent the user in the cyber space may be used. In some implementations, the virtual representation of the user may be displayed on a communication device of the user and/or one or more other users of the network and/or service platform. The communication device may include a computer, a tablet PC, a smart phone, virtual reality glasses, head-mounted displays, a smart watch, a smart ring, a smart band, a VR/AR image ring, a VR/AR gesture glove, a motion suite, a motion simulator, or the like. The communication devices of the user and the one or more other users of the network or service platform may be communicatively coupled to each other by a network such as a local area network or the internet to provide interactions between participants all over the world and/or cyber space.

Figure 6:
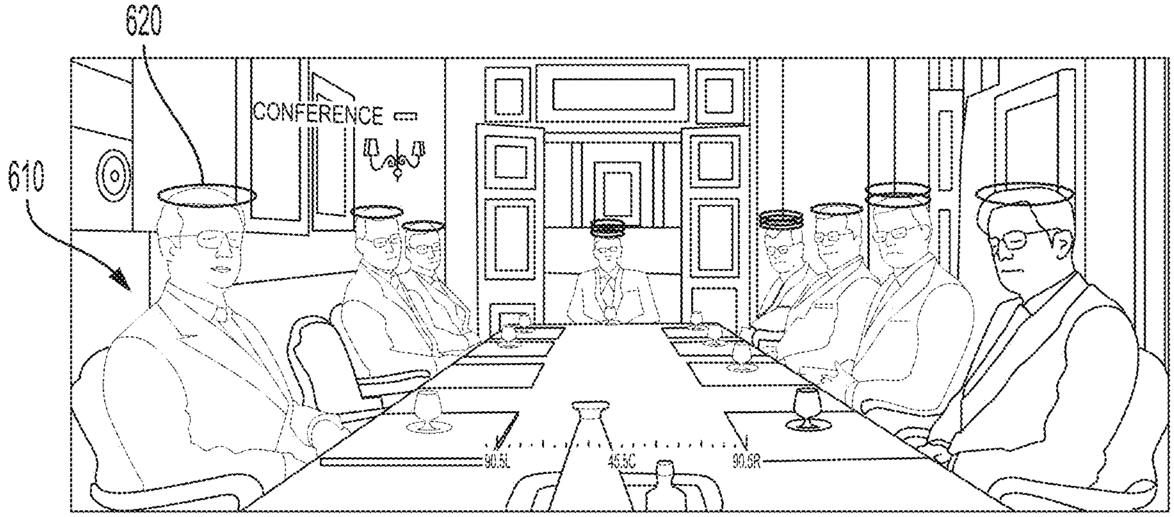
FIG. 6 is a diagram illustrating the security levels of keys of virtual meeting participants based on VR, XR, MR, AR, etc. environment visually displayed on virtual representations of the participants according to an exemplary embodiment of the present disclosure.

In some embodiments, the service network (e.g., a metaverse platform provider or a virtual environment service provider) may provide virtual meeting services using the chain of authentication according to the present disclosure. FIG. 6 illustrates levels of keys of virtual meeting participants visually displayed on virtual representations of the participants according to an exemplary embodiment of the present disclosure. As shown in FIG. 6, the level of key may be visually displaced on the virtual representation of each participant. For example, the level of the key may be represented by a number of rings 620 over the virtual representation 610 of the user, colors of the rings over the virtual representation of the user, colors of rosary on the virtual representation of the user, a number and/or color combinations of stones on a gauntlet or VR gloves worn by the virtual representation of the user, a sign language dancer by the virtual representation of the user, a color of AR glass worn by the virtual representation of the user, a length of a wand or a baton or a light sword that the virtual representation of the user possesses in the cyber space, or the like.

Referring to FIG. 6, depending on the level of key that a participant possesses, different levels of information may become available to the participant. For example, a participant may transmit messages only to other participants having a particular key level or above. The particular key level may represent a security level, a sensible level, or the like. In some implementations, participants may vote out a participant or may agree to increase or decrease the level. Additionally or alternatively, the virtual meeting service provider may implement an automated algorithm to identify a suspicious participant to evict, block, or level-down based on behavioral analysis or artificial intelligence (AI) analysis. The automated algorithm may further identify a participant to promote or level-up based on the behavioral or AI analysis.

According to an exemplary embodiment of the present disclosure, the pair of the first private key and the first public key of the user may be generated based on a first public key certificate in which a first code is inserted in an extension field thereof. The first code may correspond to biometric data or a combination of pieces of biometric data of the user. Further, additional first public keys may be generated by concatenating a plurality of codes with the first code. In such implementations, there may be a single first private key (e.g., a master key) that corresponds to a plurality of first public keys in which different sets of the plurality of codes are concatenated with the first code. The different sets of the plurality of codes inserted in the plurality of first public keys may be used for representing different purposes, respectively.

Alternatively or additionally, in some implementations, for each different set of the plurality of codes, a separate pair of the first private key and the first public key of the user may be generated based on the first public key certificate in which the different sets of the plurality of codes are inserted. In such implementations, a plurality of pairs of the first private key and the first public key may be generated depending on the different sets of the plurality of codes inserted in the extension field of the first public key certificate. The different pairs of the first public key and the first private key may be used for different purposes, respectively.

Figure 7A:
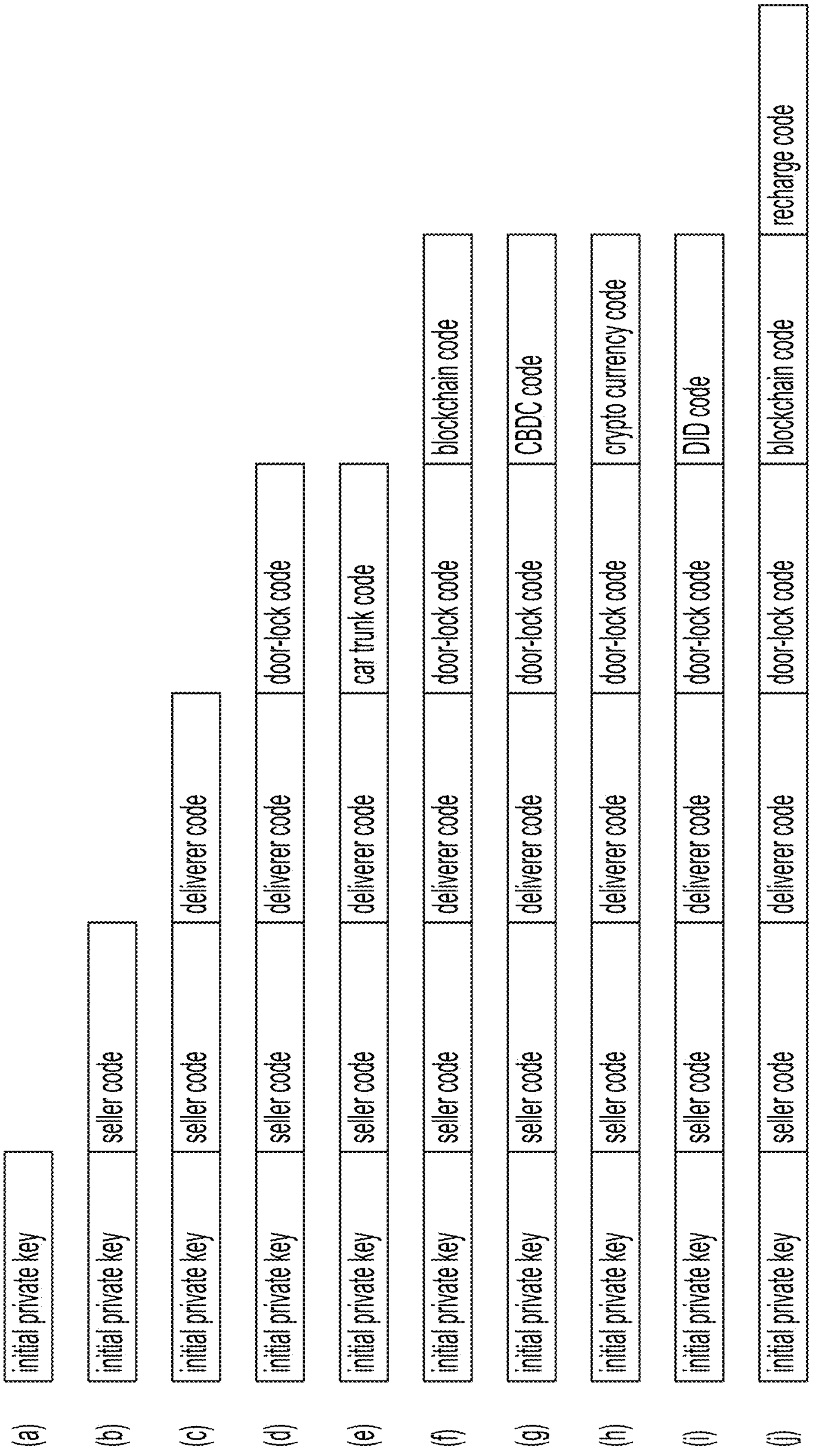
FIGS. 7A-7C illustrate various codes with different purposes that are appended in a private key according to an exemplary embodiment of the present disclosure.

For example, FIG. 7A depicts various codes for different purposes that may be appended in a private key. In particular, panel (a) of FIG. 7 shows a private key including an initial private key; panel (b) shows a private key including the initial private key and a seller code; panel (c) shows a private key including the initial private key, the seller code, and a deliverer code; panel (d) shows a private key including the initial private key, the seller code, the deliverer code, and a door-lock code; panel (e) shows a private key including the initial private key, the seller code, the deliverer code, a car trunk key, and a smart car key; panel (f) shows a private key including the initial private key, the seller code, the deliverer code, the door-lock code, and a blockchain, CBDC, or crypto currency code; and panel (g) shows a private key including the initial private key, the seller code, the deliverer code, the door-lock code, the blockchain or CBDC or crypto currency code, and a refuel (or recharge) authorization code.

Figure 7B:
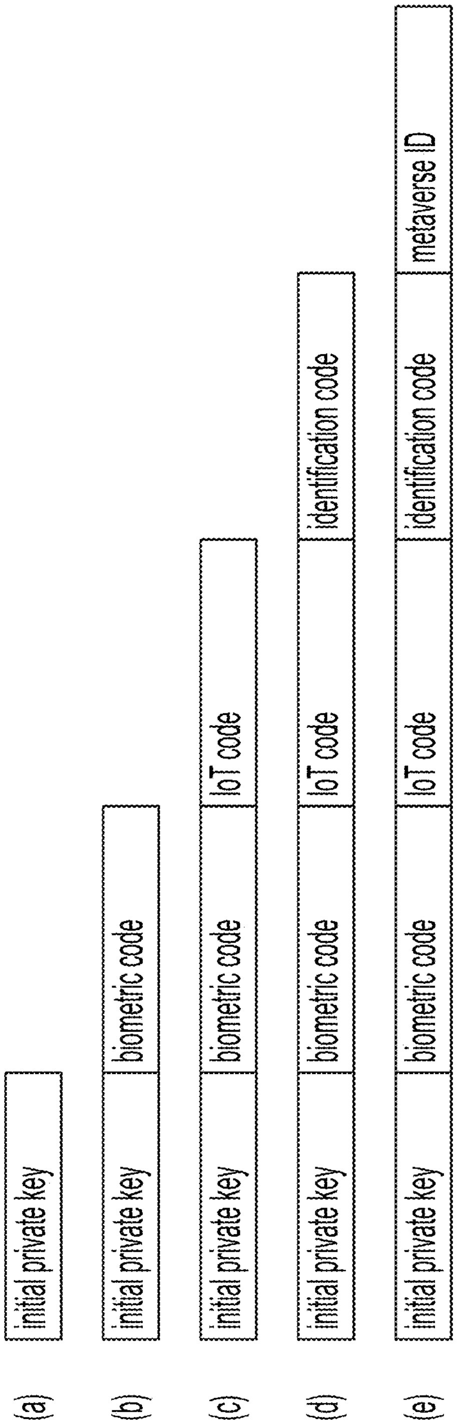
Figure 7C:
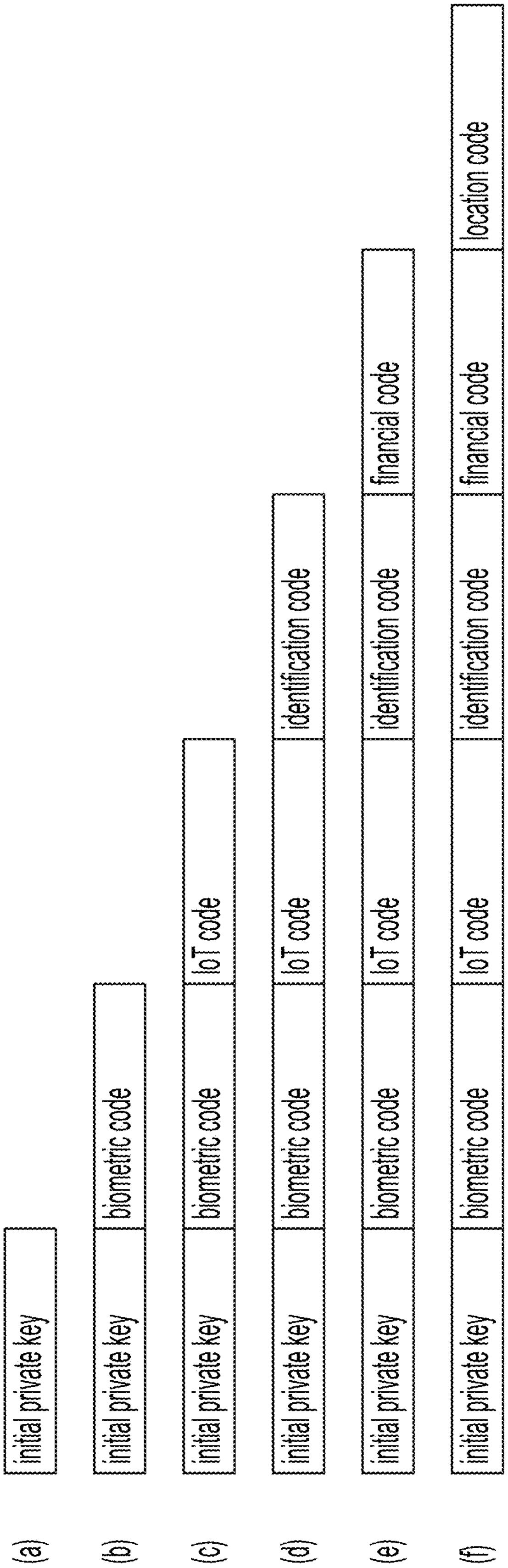

FIGS. 7B and 7C depict other codes for different purposes that may be appended in a private key. As shown in FIGS. 7B, depending on the purposes, the private key may include an initial private key appended with a biometric code, or an IoT code, or an identification code, or a metaverse ID code, or any combination thereof. As shown in FIGS. 7C, the private key may include an initial private key appended with a biometric code, or an IoT code, or an identification code, or a financial code, or a location code, or any combination thereof. Herein the initial private key may be implemented as a subscribers' private key, a publisher's private key, or the like. In some embodiments, the initial private key may mean an initially generated pair of private key and public key that is generated in accordance with a purpose based on the public key certificate.

In particular, the metaverse ID may be implemented as a symbolic text or image, or as a picture, an avatar, an emoji, a hologram, an emoticon, an emoji, or any combination thereof. Further, the metaverse ID may be implemented in combination with a predetermined voice command, or a predetermined gesture command (via such as a designed gesture with a glove, a drawing gesture with a glove, a finger-mounted device gesture, a sign language gesture, an air fingertip gesture, a gesture with a smart ring on one or more fingers, a rosary, a gauntlet, a wand, a baton, a light sword, a necklace, a bracelet, earrings, a tattoo, and the like.). The metaverse ID may be used when the user uses a service, makes a payment, executes a contract, uses escrow assets, leaves a legacy, obtains notarization, files an insurance claim, or pays tax with cyber money, crypto currency, or CBDC in the metaverse environment, which requires the biometric code of the registered user along with one or more of a code associated with the unique identity information of the IoT device or the identification code of the registered user. Similar to the actual environment, the metaverse ID may be used to check the possessor's (either a virtual being or an actual owner of the virtual being) age, access rights to restricted areas, credit scores/levels, insurance status, or the like. An identical metaverse ID may be identical for several metaverse service providers, or a plurality of metaverse IDs, associated with public key certificates with different purposes, may be used.

Metaverse ID may provide location information (e.g., GEO, GIS, GPS Information) or physical information with access rights to restricted areas, credit scores/levels, insurance status, or the like in visible or invisible form depending on the environment. However, information associated with a metaverse service provider or a metaverse framework environment, etc. may not be displayed or provided by selecting the hide activity function as stipulated in, for example, a service agreement. An additional location information or code can be utilized as an additional authentication factor for finding out falsification, forged access, or the like.

Figure 7D:
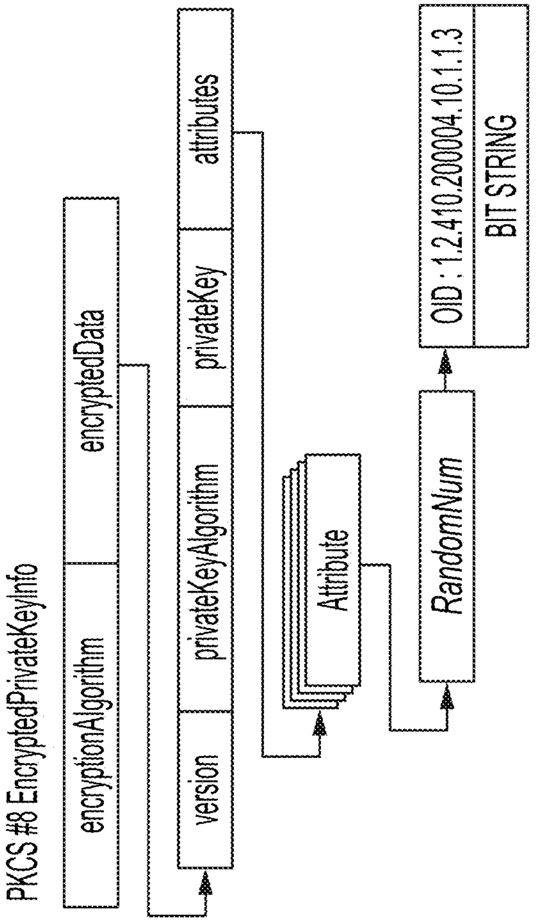
FIG. 7D illustrates a private key in which various codes shown in FIG. 7A are appended in the attributes section thereof.
Figure 8:
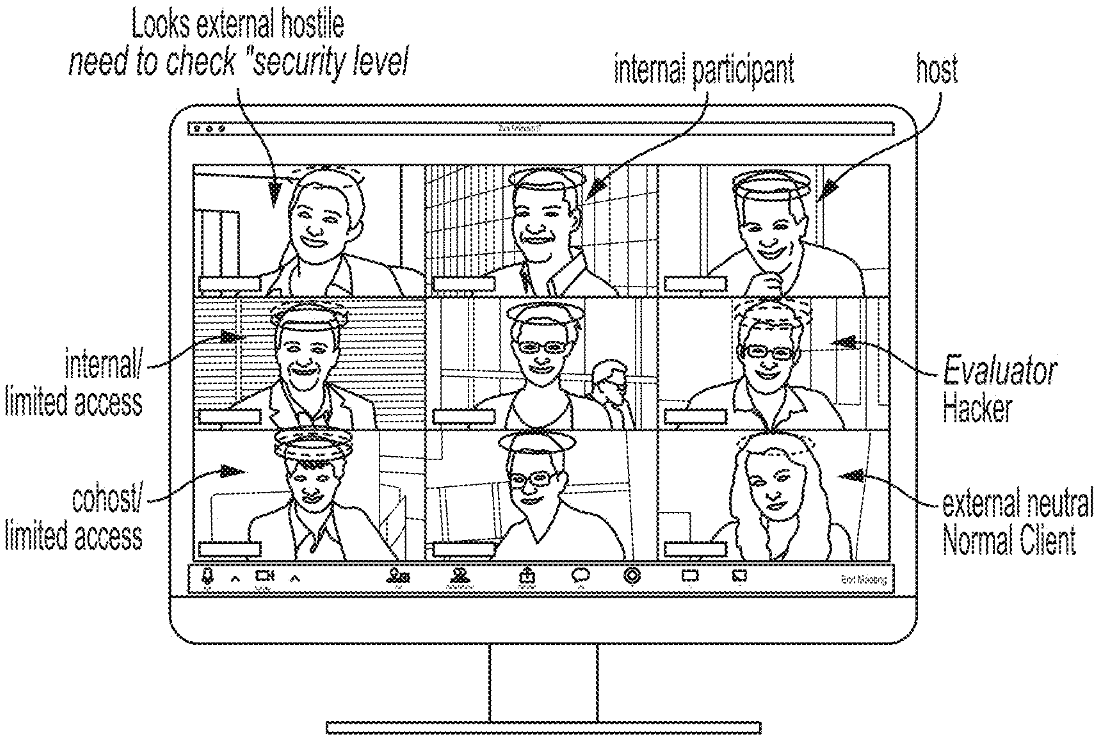
FIG. 8 illustrates a virtual meeting with each participant showing a virtual representation for trust levels according to an exemplary embodiment of the present disclosure.

FIG. 7D illustrates an example of private keys in which various codes described above are appended or inserted in the attributes section thereof. However, the present disclosure is not limited thereto, and the codes may be inserted in other places of the private key in accordance with the certificate policy (CP), certificate policy statement (CPS), certificate revocation lists (CRL), or the like.

A public key certificate may be signed by the CA. In some embodiments, multiple CAs may sign. The root CA may authorize subordinate CAs to process the certificate transactions. In such embodiments, a public key certificate may be signed by multiple CAs (referred to as a cross-signing). The particular procedure may be varied based on the PKCS methods, digital signature and code signing sequence, or the like. By way of example, the code signing sequence may follow PKCS #10 X.509 certificate signing request (CSR), PKCS #7 signed X.509 certificate, PKCS #12 X.509 certificate and private key although other sequences are also possible.

Moreover, the level of key may be decreased as well. For example, the method of chain of authentication according to an exemplary embodiment of the present disclosure may include a means to reset the level n key to the level 1 key. Further, the level (n+1) key may be restored to the level n key. The restored level n key may be subsequently recovered back to the level (n+1) key with or without authentication for the level (n+1). In some implementations, the user may decrease the level of the key and transfer the rights of the key (thereby the rights of the IoT device) to another user. In this manner, when the IoT devices are transferred to another user due to a sale, purchase, or rental of a house having a registered device, the central controller 530 and IoT service provider server 540 may provide transfer options such as cancellation, reset, initialization, transitioning from online status to offline status, or the like. Accordingly, certain features may remain available without separately authenticating the new user, and some other features may require new authentication by an IoT authentication server with the IoT service provider for updating the billing information for the IoT service.

Exemplary Embodiment 1—Delivery Model in IoT Environment

Figure 5:
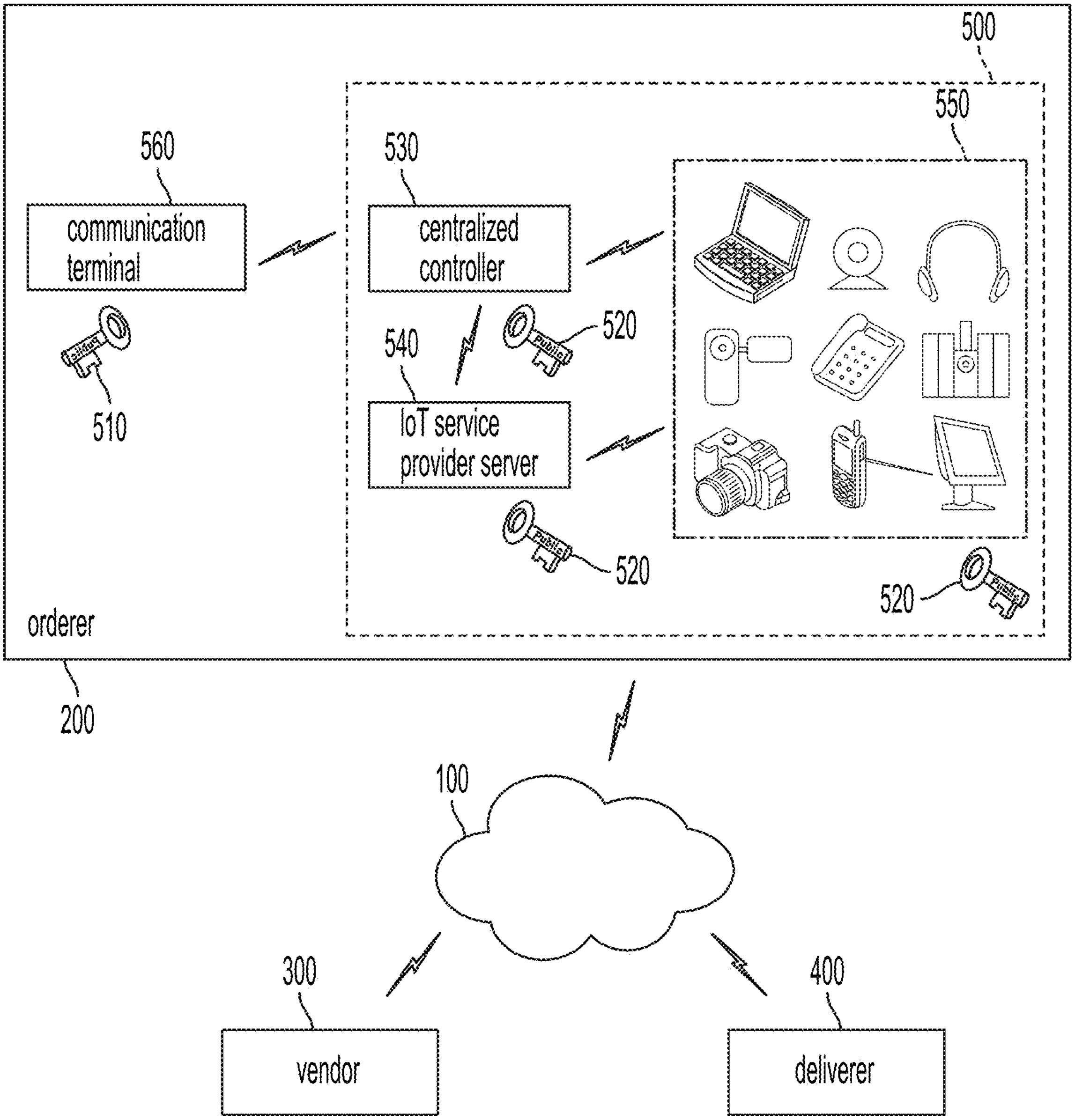
FIG. 5 is a schematic diagram of a system configuration for managing a user of an IoT device in ubiquitous environment according to an exemplary embodiment of the present disclosure.

In one exemplary embodiment as shown in FIG. 5, a user may be pre-registered as a legitimate user of an IoT device via a communication terminal 560 that communicates with an IoT network 500. The communication terminal 560 (e.g., a smart watch, AR/MR glasses, a head-mounted display, a smart phone, a smart ring, a smart band, a wearable device, an AR/VR glove, a motion suite, a motion simulator, or the like) may include a capability of acquiring biometric data of the user. The IoT network 500 may include various IoT devices 550 having a wired/wireless communication function, such as an AI speaker, a smart watch, AR glasses, a head-mounted display, a smart phone, a home hub or bridge, a smart TV, a PC, a door-lock, a door bell, an elevator, a light, a faucet, a camera, an air conditioner, a garage door, or the like. In a network that covers a predetermined area such as a company, a building, a business center, a home, a car, a parking lot or garage, or the like, the IoT network 500 may include a centralized controller 530 that manages (e.g., registers, monitors, controls, approves access, tracks devices, or the like) the various IoT devices 550. The centralized controller 530 (such as, for example, an AI speaker, a TV, a refrigerator, a set-top box, a home hub or bridge, an elevator, a smart phone, "smart phone-to-smart phone," a game controller, a bridge, a router, a butler robot, a hospice robot, a majordomo robot, a companion robot, an associate robot with hologram, and the like) may be further configured to provide a user interface and may combine functions of the IoT devices 550 to provide an integrated service.

A pair of a private key 510 and a public key 520 may be generated based on a PKI certificate in which biometric data or a combination of pieces of biometric data of the user is inserted. The private key 510 may be stored in a secure element of the communication terminal 560, and the public key 520 may be transmitted an IoT service provider server 540, the centralized controller 530, and/or the various IoT devices 550. The public key 520 of the user may be further registered to a network 100 (e.g., a cloud network, a delivery service network, or a metaverse service network) which includes an operating system server or a delivery service server. The network 100 on the Internet cloud system may connect the buyer 200; a seller or a vendor 300; and a drone, a UAV, a robot, a self-driving vehicle, a door lock, an elevator, or a portable device of a deliverer 400.

In order to place an order, the IoT device 550 or the centralized controller 530 may take the order from a person, a robot, an avatar, a hologram, or the like. The IoT device 550 or the centralized controller 530 may verify whether the person who is attempting to place the order is the registered user of the IoT device 550 based on a predetermined voice command, a predetermined gesture command (via such as, for example, a designed gesture with a glove, a drawing gesture with a glove, a finger-mounted device gesture, a sign language gesture, an air fingertip gesture, a gesture with a smart ring on one or more fingers, a rosary, a gauntlet, a wand, a baton, a light sword, and the like), or a brain wave that is prescribed in the public key 520 of the user. When the IoT device 550 successfully verifies the registered user, the IoT device 550 may transmit the contents of the order along with authentication information signed with the private key 510 of the user. Alternatively, the IoT device 550 or the centralized controller 530 may generate a level 2 key in which both the biometric code of the registered user and a code associated with the unique identity information of the IoT device 550 are inserted.

In general, an identification code of the registered user and any combination of codes described herein may be inserted in the level 2 key. The code associated with identification information of the person may include a code associated with a resident registration number of the person, a code associated with a driver's license of the person, a code associated with a medical card of the person, a code associated with a social security number of the person, a code associated with a passport of the person, a code associated with voter registration of the person, or a code associated with any combination thereof.

Herein, in addition to the public key for an ordering purpose (e.g., "an order public key"), another public key for a separate purpose, for example "a kill public key," may be generated and distributed with the order and the order public key as well. The kill public key may be designated for a purpose of terminating the delivery in case the operating system or any party (buyer, seller, or deliverer) detects suspicious activities such as an attempt to forcibly open the delivery compartment or container of the drone, UAV, robot, self-driving car, or the like. The kill public key may also be stored in a secure element of the deliverer along with the order public key.

The operating system of the delivery service may authenticate the buyer 200 based on the received authentication information signed with the buyer private key, and upon successful authentication, the operating system of the service may authorize a seller or a vendor 300 to place the ordered item in the delivery compartment of the deliverer 400 and lock the container or box or trunk thereafter. The operating system may monitor or track the geographical location of the deliverer 400 and whether the delivery compartment thereof remains locked. If the lock status of the delivery compartment is changed (e.g., to a "container open" status), the operating system may activate the kill public key and terminate the delivery service.

When the deliverer 400 arrives at the destination, the buyer 200 and the deliverer 400 may mutually authenticate each other based on their public keys each signed with its corresponding private key. In particular, both parties may verify the modified public key in which the public keys of the buyer 200, the vendor 300, and the deliverer 400 are each signed with its corresponding private key. Since both the buyer 200 and the deliverer 400 may transmit the modified public key only after being authenticated based on the biometric code or the unique code inserted in the keys, the presentation of valid modified public key by each party may prove the identity of the each party. The biometric-based security measure embedded at the certificate level may enable such mutual authentication with the improved level of security. Upon successful mutual authentication, the deliverer 400 may open its delivery compartment and allow the buyer 200 to take the ordered item. Alternatively, the buyer 200 or the IoT device 550 of the buyer 200 may authorize the deliverer 400 to deliver the item to a designated location such as inside a house, a delivery box, a trunk of a car, a hotel room, a garage, an office, a factory, a warehouse, or the like.

Additionally, after the delivery is made, the deliverer 400 may further perform removal of packaging material, assembly of the product, collection of old product (e.g., returning item, replacement item, or defective/broken item), collection of the wrapping material, or the like, if such requests are authorized for free or with payment. Further, the deliverer 400 may provide instructions on how to assemble the product and/or how to use the product using the buyer's wearable devices such as headset, head-mount display, smart glass, motion suite, motion simulator, and the like based on an avatar, a hologram, or the like.

Exemplary Embodiment 2—Level of Key Model for Single Key Log-In

In another exemplary embodiment, a user may create an account ID in website A (hereinafter, a website may also refer to a smart phone application or a metaverse access). Initially, to register the user, the website A may request a public key of the user. Subsequently, the website A may challenge the user to sign the public key of the user with the user's corresponding private key and return it to the website A. Here, the challenge is not limited to the public key of the user, and it may include any information, data, and/or messages. The website A may verify the signed public key based on the previously received public key of the user. Upon successful verification, the website A may increase the user's level of key by inserting unique identity information of the website A signed with its private key. At this point, the user possesses a level 2 key, and a virtual representation of the user in the cyber space (e.g., an avatar or a hologram) may bear a virtual indication that the user is legitimately registered to the website A.

The user may register the account ID also in website B. To do so, the user may provide the website B with the user's public key that is the same as the public key shared with the website A. Subsequently, the user may present the user's level 2 key signed with the user's private key to the website B. The website B may authenticate the account ID based on the previously received public key of the user. Upon successful verification, the website B may increase the user's level of key by inserting unique identity information of the website B signed with tis private key. At this point, the user possesses a level 3 key, and the virtual representation of the user in the cyber space or metaverse may bear the virtual indication that the user is legitimately registered to both the websites A and B.

In this manner, the user may use a single pair of a private key and a public key in multiple websites or smart phone applications or metaverse instead of maintaining a separate pair of a private key and a public key for each website. Furthermore, instead of transmitting an ID and a password to log in to each of the websites or biometric authentication access, the user may transmit the user's level n key signed with the user's private key to any of the registered websites or smart phone applications or metaverse for logging in. In some embodiments, an ID, a password, an OTP, or biometric authentication with mobile OTP, a verified code, or numbers may be added to the user's level n key. Since the public key signed with the private key may only be transmitted after being successfully authenticated based on the biometric code inserted in the keys, the log-in process may become more secure and convenient.

Exemplary Embodiment 3—Level of Key Model for Information Access

In yet another exemplary embodiment, a user may request an access to different levels of information or service. In such embodiment, the level of key may be sequentially established. For example, when the user becomes a member of a company, a community, a service network, or a metaverse, a level 1 key may be awarded by default. The user may acquire an access to Service A by applying for a level 2 key. The level 2 key may be granted after verifying the identity of the user, for example, based on the biometric code inserted in the certificate of the user. In some implementations, the operating system of the service may require the user to satisfy additional criteria to obtain the level 2 key. The additional criteria may include, for example, training, promotion, payment of a fee, or the like. When the user satisfies all of the criteria set forth for the level 2 key, the system may generate the level 2 key by concatenating the level 1 key and a unique identity information for Service A signed with a private key for Service A.

Subsequently, the user may obtain a level 3 key that grants the user to have an access to Service B. Similarly, when the user satisfies all of the criteria set forth for the level 3 key, the system may generate the level 3 key by concatenating the level 2 key and a unique identity information for Service B signed with a private key for Service B.

In some implementations, Service A may be an access to confidential information, and Service B may be an access to higher level confidential information and/or to secret information. During a virtual or metaverse conference in which virtual representations of the participants are virtually present, the levels of access to information may be visually displayed on each virtual representation. Participants may share information among the participants with a key that has been granted a predetermined level or higher. By way of example, the predetermined level may include top secret, secret, confidential, inside only, and open.

In some implementations, the meeting host may invite participants that meets particular limitations such as "in-house," "same group," "same project," or the like. The meeting host may restrict the participants based on the security level. Participants without the required security level may merely attend temporarily, partially, or with limited access. Upon detecting that a participant behaves suspiciously, based on behavioral monitoring either manually or autonomously using AI, the meeting host and/or other participants may assign the suspicious participant with a yellow tag, red tag, or the like, or alternatively, may vote the suspicious participant out. Upon more serious violations, the specifics of the suspicious participant may be set to "unalterable" and recorded. The recorded cyber forensics may be reported or provided to law enforcement authorities.

In some implementations, the service may include a drone, robot, UAV, personal air vehicle (PAV), urban air mobility (UAM), self-driving car, or delivery infrastructure network. In such implementations, Service A may represent an access to landing sites or parking spaces, and Service B may represent an access to wired/wireless electricity charging stations, refueling stations, or the like. When a drone which is registered in the network possess a level 2 key, the drone may be allowed to use the landing sites provided by the network, but may be rejected from using the wired/wireless charging stations, refueling stations, or the like. When the drone obtains a level 3 key by, for example, paying a required fee, it may be allowed to use the wired/wireless charging stations, refueling stations, or the like as well. Merely by presenting the level 3 key to the charging station, and by the charging station verifying the drone's level 3 key based on the drone's public key that has been previously shared, the charging station may authorize the drone to the use the charging station. Accordingly, unlike the methods of providing different levels of service in the related art, in which the charging station should inquire the central operating system of the service whether the particular drone that is attempting to use the charging station has a right to use the charging stations or not, the method for chain of authentication according to the present disclosure may allow the charging station to determine whether or not the particular drone that is attempting to use the charging station has a right of the service, without inquiring the central operating system. In some embodiments, the charging station may verify the particular drone based on a separate "offline access code" in the offline environment. Therefore, the methods of chain of authentication according to the present disclosure may provide more convenient and rapid authentication with more robust security.

Exemplary Embodiment 4—Virtual Meeting Service

Another exemplary embodiment of the present disclosure relates to a method for virtual meetings or metaverse meetings. The method for virtual meeting may include displaying a virtual representation of a participant, and displaying authentication status information of the participant. In particular, the authentication status information of the participant may include information configured for authentication based on a public key infrastructure (PKI) certificate.

The PKI certificate may be implemented as a blockchain certificate, a decentralized identification (DID) certificate, a cryptocurrency certificate, an Internet-of-things (IoT) certificate, an avatar certificate, a manufacturer certificate, a mixed reality certificate, a virtual government certificate, a central bank digital currency (CBDC) certificate, a metaverse certificate, or any combination thereof.

The authentication based on the PKI certificate can include any of the methods and processes disclosed herein, such as a biometric code contained in the PKI certificate. In some embodiments, the biometric code may include an object identifier (OID), a distinguished encoding rules (DER) code, a user verification index (UVI) code, or any combination thereof. Further, the authentication status information of the participant may also include information associated with network connection status, information associated with type of device that the participant is using to participate in the virtual meeting or metaverse meeting, information associated with payment method, information associated with cryptocurrency, information associated with central bank digital currency (CBDC), information associated with GPS location, information associated with IP address, information associated with MAC address, information associated with metaverse, information associated with virtual property on metaverse, information associated with premises on metaverse, or any combination thereof.

Figure 10:
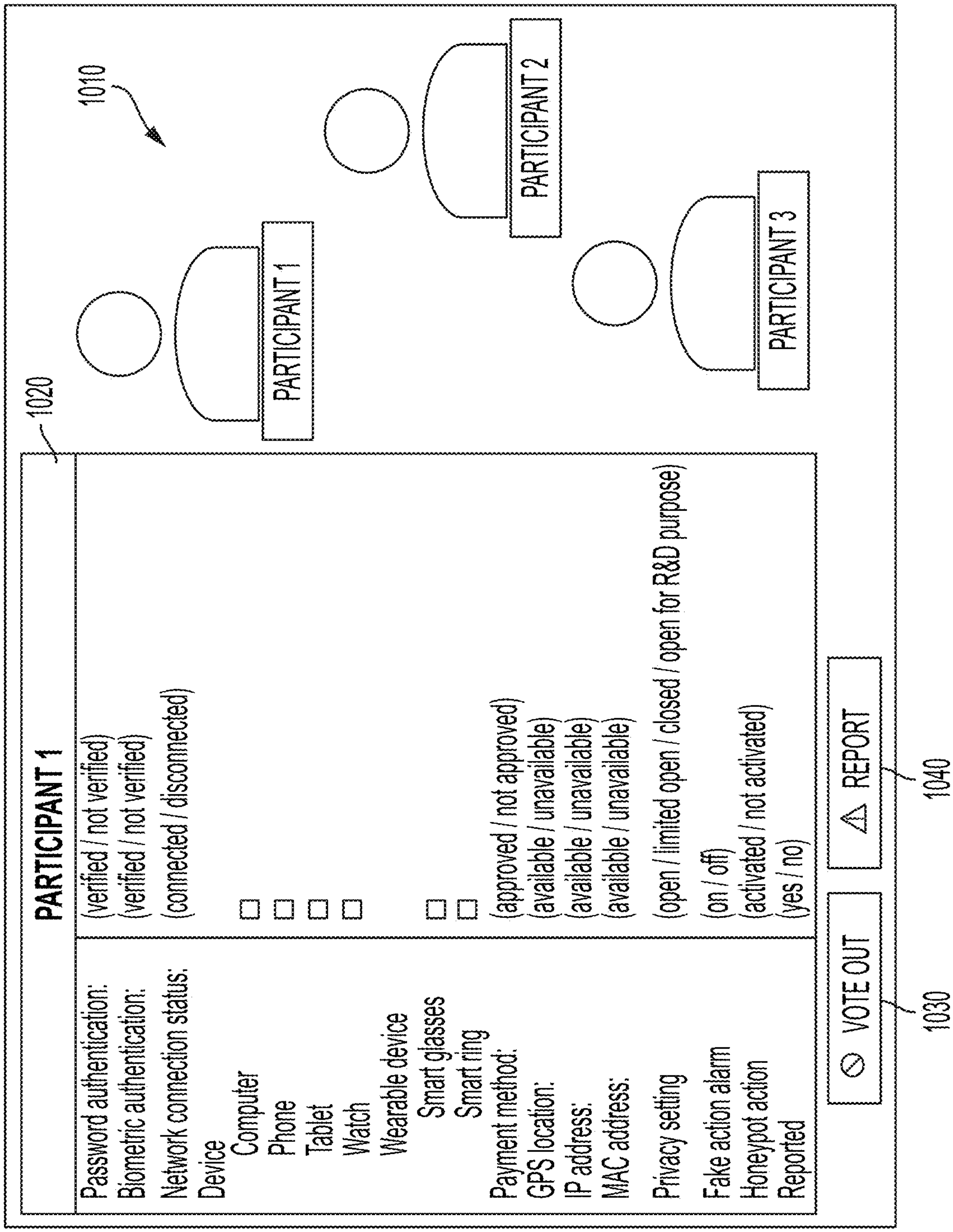
FIG. 10 shows an example of virtual meeting screen displaying authentication status information of participants according to an exemplary embodiment of the present disclosure.

FIG. 10 shows an example of the virtual meeting screen, where the authentication status information of a participant 1010 is displayed in a window 1020. The authentication status information windows 1020 of the participant 1010 may be turned on constantly or displayed on-demand basis or as an overlay with or without varying opacity.

As shown in FIG. 10, the authentication status information that may be displayed during the virtual meeting or metaverse meeting may include, but is not limited to, whether the participant's password has been verified; whether the participant's biometric information has been verified; whether the participant's network is connected; which device that the participant is using to participate the meeting, e.g., a computer, a phone, a tablet, a watch, a wearable device such as smart glasses, a motion suite, a motion simulator, or a smart ring; whether the participant has a payment method approved; whether the GPS-based location is available and/or the GPS-based location data of the participant; whether the IP address is available and/or the IP address data of the participant; and whether the MAC address is available and/or the MAC address data of the participant. Further, the privacy setting may be displayed as well. In some embodiments, to some or all participants, alarm or reporting status of the participant may also be displayed.

For example, whether a fake action alarm has been triggered, whether a honeypot action has been activated with an automated trace-back process, or whether the participant has been reported to a law enforcement agency may be displayed.

Herein, the term honeypot may refer to a computer security mechanism set to detect, deflect, or, in some manner, counteract attempts at unauthorized use of information systems. Generally, a honeypot includes data (for example, in a network site) that appears to be a legitimate part of the site and contain information or resources of value to attackers, which is actually isolated, monitored, and capable of blocking or analyzing the attackers. Herein, the term "attacker(s)" can mean person(s), virus, or ransomware.

In some embodiments, the virtual representation of the participant 1010 may be implemented as a picture, an avatar, a memoji, a hologram, an emoticon, an emoji, or any combination thereof.

In some embodiments, the privacy information of the participant may be preset by the participant. For example, the privacy information of the participant may be set between open, closed, and research purpose only, in compliance with a regulation for privacy or a regulation for digital accessibility (e.g., accessibility functions implemented in a website, a mobile application, a metaverse, or an electronic document to facilitate understanding and navigating even for those have visual, auditory, motor, or cognitive disabilities), such as a general data protection regulation (GDPR) standard and accessibility for Ontarians with disability act (AODA), etc.

Referring to FIG. 10 again, other participants may choose to vote out (e.g., evict) a participant from the virtual meeting, for example, by pressing a "vote out" button 1030. In this regard, the virtual meeting may receive votes from other participants, and evict a participant from the virtual meeting in response to a number of the votes from other participants exceeding a predetermined number. In some embodiments, as described above, the participants may choose to provide a trap (e.g., honeypot) to entice the participant in response to a number of the votes from other participants exceeding a predetermined number. The participant's behavior in the trap may be collected and preserved as forensic evidence. One or more participants may also choose to report the evicted participant to a law enforcement agency and/or report the collected and preserved forensic evidence, for example, by pressing a "report" button 1040.

Figure 11A:
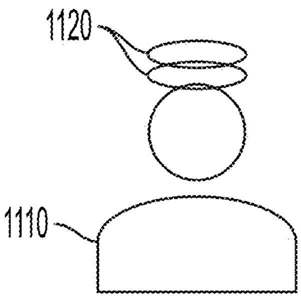
FIGS. 11A-11D show various examples of displaying authentication status information of a participant according to exemplary embodiments of the present disclosure.
Figure 11B:
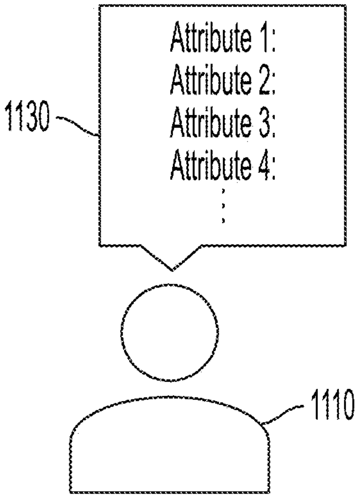
Figure 11C:
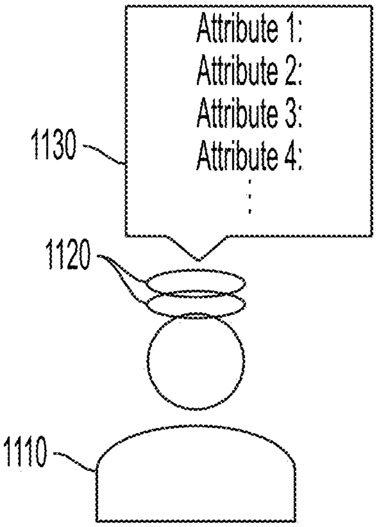
Figure 11D:
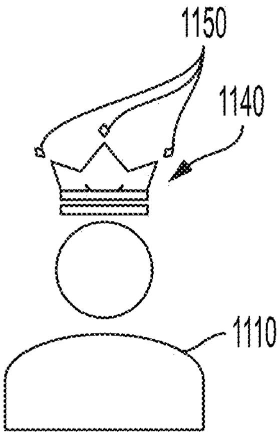

FIGS. 11A-11D show examples of the authentication status information being displayed. As shown in FIG. 11A, the authentication status information may displayed in the form of one or more over-head angel rings (e.g., halo rings) 1120 appearing over a head of the virtual representation 1110 of the participant. Further, the color of each over-head angel ring 1120 may convey different status information. As shown in FIG. 11B, the status information may be provided as a pop-up box 1130. In some embodiments, as shown inf FIG. 11C, the virtual representation 1110 may display both the angel rings 1120 and the pop-up box 1130. In such embodiments, the pop-up box 1130 may convey information that is not provided by the angel rings 1120 and/or provide more details of the information conveyed by the angel rings 1120. In some embodiments, as shown in FIG. 11D, the authentication status information may be displayed in the form of a crown 1140 that includes one or more gem stones 1150. Similar to the angel rings 1120, the placement of the gem stones 1150 and/or the color thereof may convey particular information.

According to the exemplary embodiments of the present disclosure, different activities may be permitted for the participant based on the authentication status, and the permitted activities may be displayed for other participants in various forms, such as the number of the angel rings 1120, the placement of the gem stones 1150, the color of each of the gem stones 1150, or the like, that are displayed over the head of the virtual representation 1110 of the participant. The forms or the representation methods for displaying the status information are not particularly limited, and they may include a designed motion (e.g., animated motion) by a angel ring over a head of the virtual representation, a (still or animated) symbol, an air fingertip motion, a hair accessary, a crown, a rosary, a gauntlet, a gauntlet with a ring, a gauntlet with stones, devil's horns, a skull, a wand, a baton, a light sword, or any combination thereof.

In some embodiments, the virtual representation of the participant and the authentication status information of the participant may be monitored by one or more staff members in a virtual interrogation room or a security monitoring room.

Exemplary Embodiment 5—Delivery Service

Figure 12:
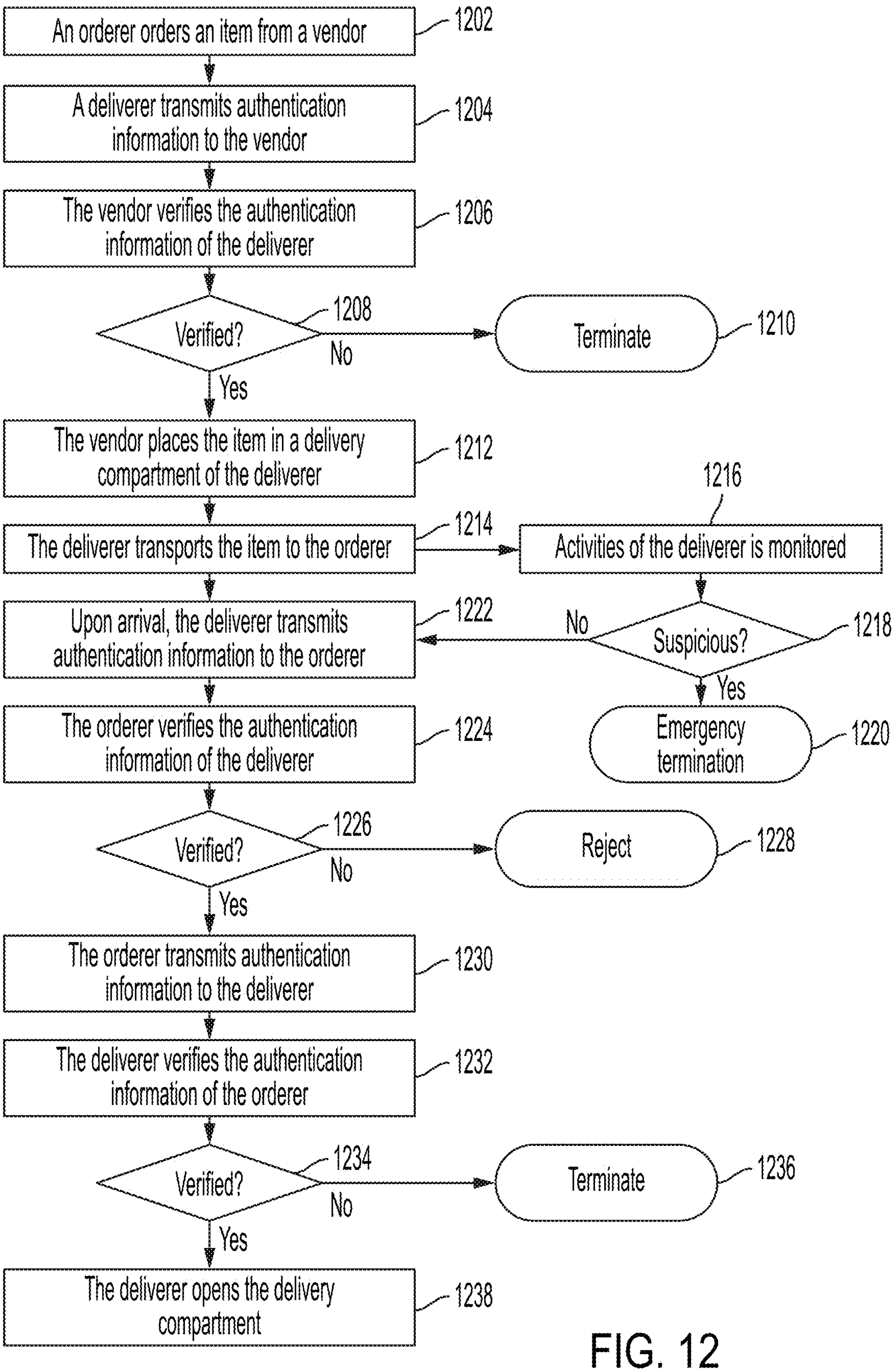
FIG. 12 shows a flow chart illustrating the process of delivery service according to an exemplary embodiment of the present disclosure.

Another exemplary embodiment of the present disclosure relates to a method for providing a delivery service. The method will be described below with reference to the flow chart shown in FIG. 12.

According to the exemplary embodiment, an orderer may order an item from a vendor (1202). In response, the vendor may call for a deliverer, and the deliverer may transmit its authentication information to the vendor (1204). The vendor may verify the authentication information provided by the deliverer (1206 and 1208). Herein, the authentication information may include information configured for authentication based on a public key infrastructure (PKI) certificate as described above. If the verification fails, the delivery process may be terminated (1210). If the verification is successful, the vendor may place the item in a delivery compartment of the deliverer (1212).

Subsequently, the deliverer may start transporting the item to the orderer (1214). During the transportation, the activities of the deliverer may be monitored (1216) to detect any suspicious activities (1218) such as attempting to open the container by force or online malicious attack. For example, the activities of the deliverer may be monitored in a virtual monitoring room. If any suspicious activities are detected, the delivery process may be terminated (1220) by issuing an emergency termination signal, which may be transmitted from any of the vendor, an orderer, a service providing server, or a monitoring robotic platform. If no suspicious activity is detected, the deliverer may reach the orderer with the item secured in the delivery compartment. Herein, the delivery compartment may be designed and manufactured for resisting attempts to tamper, and the size, shape, and number of the delivery compartment provided in the deliverer are not particularly limited.

Upon the deliverer reaching the orderer, the deliverer may transmit its authentication information to the orderer (1222). In turn, the orderer may verify the authentication information provided by the deliverer (1224 and 1226). If the verification fails, the orderer may reject the delivery (1228), and the delivery process may be terminated. If the verification is successful, the order may also transmit its authentication information to the deliverer (1230). Similarly, the deliverer may now verify the authentication information provided by the orderer (1232 and 1234). If the verification fails, the deliverer may refuse to hand over the item and may terminate the delivery process (1236). In this case, the deliverer may return to the vendor and may return the item to the vendor. In response to successfully verifying the authentication information of the orderer, the deliverer may open the delivery compartment or a secure container or a lock box (1238) that has been sealed by a smartphone, a card, a USB, a wearable band, a smart watch, smart glasses, or any combination thereof with biometric authentication capability.

Herein, as described above, the information configured for authentication based on the PKI certificate may include a code contained in the PKI certificate, the code including information associated with unique identity data of the deliverer, information associated with a decentralized identity (DID) data of the deliverer, or any combination thereof. In some embodiments, the authentication information of the orderer may include a code contained in a PKI certificate, and the code may include information associated with biometric data of the orderer. Further, the authentication information of the orderer may include an Internet-of-Things (IoT) code contained in a PKI certificate, the IoT code including information associated with unique identity data of an IoT device of the orderer, information associated with decentralized identity (DID) data of an IoT device of the orderer, or any combination thereof.

The PKI certificate may be implemented as a blockchain certificate, a decentralized identification (DID) certificate, a cryptocurrency certificate, an Internet-of-things (IoT) certificate, an avatar certificate, a manufacturer certificate, a mixed reality certificate, a virtual government certificate, a central bank digital currency (CBDC) certificate, a metaverse certificate, or any combination thereof.

In some embodiments, the IoT device of the orderer may be implemented as a terminal, a smart phone, a smart watch, smart glasses, a smart ring, a smart speaker, a smart TV, a virtual reality (VR) headset, an augmented reality (AR) headset, a mixed reality (MR) headset, a wand, a gauntlet, a baton, a light sword, a motion suite, a motion simulator, or any combination thereof.

In some embodiments, the steps of verification may be performed based on the PKI-based authentication techniques. For example, between the vendor and the deliverer, the vendor may transmit to the deliverer first information signed with a private key of the orderer and second information signed with a private key of the vendor. Upon the deliverer reaching the orderer, the deliverer may transmit to the orderer the first information signed with the private key of the orderer, the second information signed with the private key of the vendor, and third information signed with a private key of the deliverer. In turn, the orderer may verify the first information, the second information, and the third information based on a public key of the orderer, a public key of the vendor, and a public key of the deliverer, respectively. In response to successfully verifying, the orderer may transmit to the deliverer fourth information signed with the private key of the orderer. Similarly, the deliverer may verify the fourth information based on the public key of the orderer. Once the verification is successful, the deliverer may open the delivery compartment or the sealed secure container or the lock box and hand over the item to the orderer.

In some embodiments, the deliverer may be further configured to collect packaging material of the item. In some embodiments, the deliverer may also provide assembly instruction or operating manual instruction of the item to the orderer. Here, the assembly instruction or operating manual instruction of the item may be provided in a virtual environment based on virtual reality (VR), augmented reality (AR), mixed reality (MR), or hologram.

In some embodiments, the item may be delivered to a delivery box that is predetermined by the orderer. For example, the delivery box may be disposed inside a house, an office, or a hotel room, or implemented as a safety box, a car trunk, a refrigerator, or a designated landing zone for drones or UAVs.

In some embodiments, the deliverer may be implemented as an unmanned, autonomously-driving robotic platform, such as a robot, an autonomously-driving car, an autonomously-driving truck, an unmanned aerial vehicle (UAV), an autopiloted helicopter, or an autonomously-driving kickboard.

Exemplary Embodiment 6—Operating a Fleet of Robotic Vehicles

Figure 13:
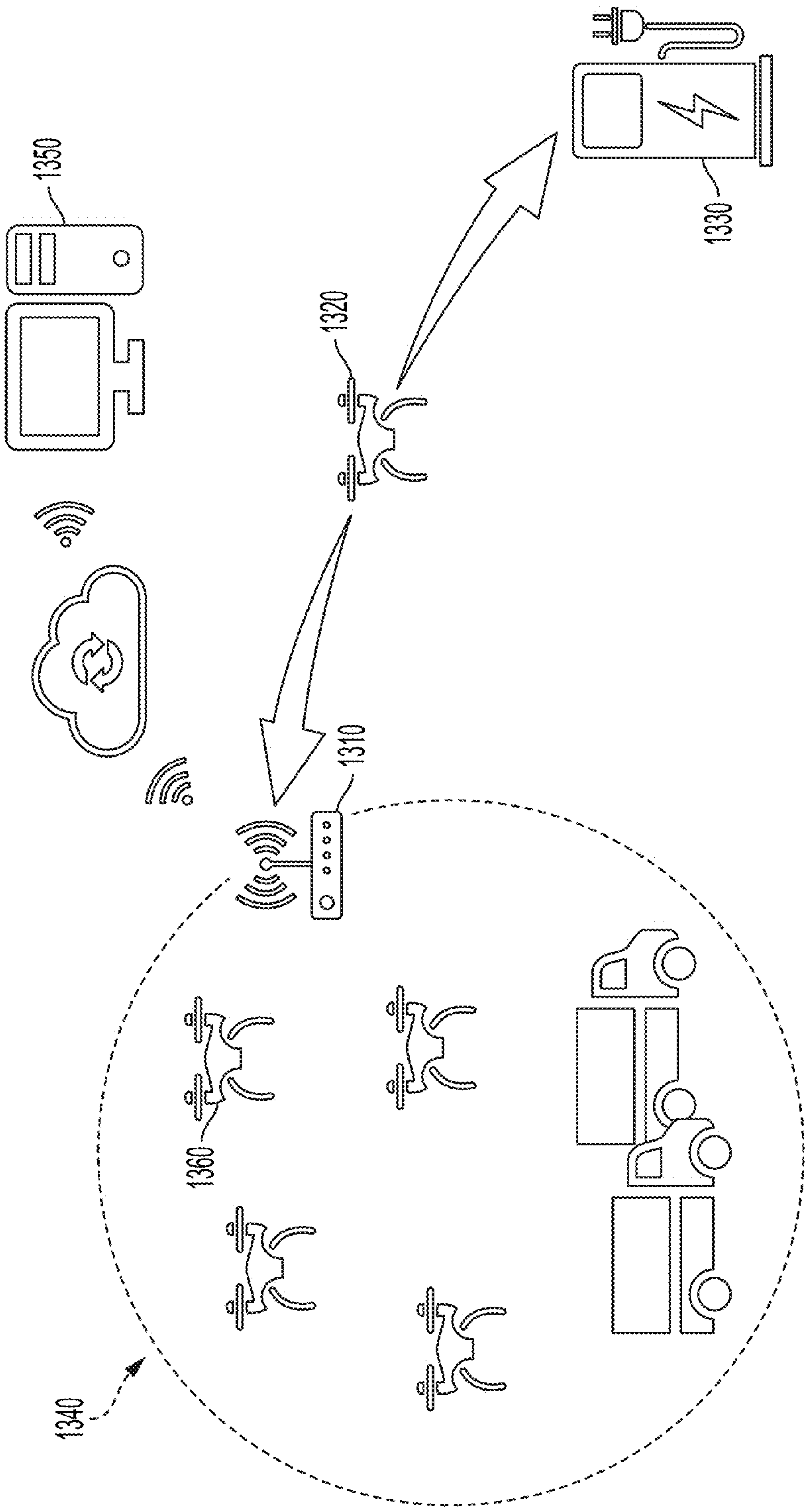
FIG. 13 illustrates operation of a fleet of robotic vehicles according to an exemplary embodiment of the present disclosure.

Yet another exemplary embodiment of the present disclosure is provided for operating a fleet of robotic vehicles. Referring to FIG. 13, an operation management entity 1310 may receive authentication information from a robotic vehicle 1320, and verify the authentication information received from the robotic vehicle 1320. In response to successfully verifying the authentication information, the operation management entity 1310 may permit the robotic vehicle 1320 to use one or more services. Herein, the authentication information may include information configured for authentication based on a public key infrastructure (PKI) certificate. Similar to the exemplary embodiments described above, the PKI certificate may be implemented as a blockchain certificate, a decentralized identification (DID) certificate, a cryptocurrency certificate, an Internet-of-things (IoT) certificate, an avatar certificate, a manufacturer certificate, a mixed reality certificate, a virtual government certificate, a central bank digital currency (CBDC) certificate, a metaverse certificate, or any combination thereof.

In this exemplary embodiment, the robotic vehicle may be implemented as an aerial vehicle, an autonomously-driving ground vehicle, or an autonomously-driving kickboard.

In some embodiments, the one or more services provided for the robotic vehicle 1320 may include using a charging station 1330. In some embodiments, the one or more services may include joining a formation cruising with the fleet 1340 of robotic vehicles, whereby the robotic vehicle 1320 cruises with a plurality of other robotic vehicles that have been authenticated by the operation management entity. Herein, the fleet 1340 of robotic vehicles may be a homogeneous fleet where all of the members are of a same kind (e.g., a drone) or a mixed fleet where different kinds (e.g., a drone and a truck, as shown in FIG. 13) are mixed.

In some embodiments, the information configured for authentication based on the PKI certificate may include a code contained in the PKI certificate, the code including information associated with unique identity data of the robotic vehicle, information associated with a decentralized identity (DID) data of the robotic vehicle, or any combination thereof.

Further, the information configured for authentication based on the PKI certificate may also include a second code contained in the PKI certificate, the second code being configured to be used in case that the operation management entity 1310 is disconnected from a service providing server 1350. As such, when the second code is used for authentication, the operation management entity 1310 may be configured to provide a predetermined set of services, the scope of which is less than the services that the operation management entity 1310 provides when the second code is not used. To settle the transaction after the operation management entity 1310 gets back on-line, the operation management entity 1310 may store transaction information, and transmit the stored transaction information to the service providing server 1350 when the operation management entity 1310 gets connected to the service providing server 1350. In turn, the service providing server 1350 may settle the transaction information.

In some embodiments, the operation management entity 1310 may be implemented as a separate server that is remotely provided. In some other embodiments, the operation management entity 1310 may be implemented as another robotic vehicle 1360 within the fleet 1340 of robotic vehicles. In some embodiments, the charging station 1330 may be provided in a ground vehicle, an aerial vehicle, a helipad, a cruise ship, a roof of a building, a roof of a truck (i.e., a tractor of a truck or a container of a truck), or a tunnel ventilation fan.

Further, the activities of the fleet of robotic vehicles may be monitored in a virtual monitoring room.

Exemplary Embodiment 7—Electronic Transaction or Contract Using Wearable Devices Another aspect of the present disclosure provides a method for electronic transaction. According to this exemplary embodiment, two or more parties may initiate and compete electronic transactions using wearable devices. In some embodiments, two or more parties may execute a contract using wearable devices.

First, a first party may abut or contact its first wearable device belonging thereto with a second wearable device belonging to a second party. Upon contacting, the first wearable device may transmit authentication information of the first party to allow the authentication information of the first party to be verified. Subsequently or concurrently, the second wearable device may transmit authentication information of the second party to allow the authentication information of the second party to be verified. The electronic transaction may be authorized, or the contract can be executed, in response to successfully verifying both the authentication information of the first party and the authentication information of the second party.

In particular, each of the authentication information of the first party and the authentication information of the second party may include information configured for authentication based on a public key infrastructure (PKI) certificate. The information configured for authentication based on the PKI certificate may include a code contained in the PKI certificate, the code including information associated with biometric data of the first party or the second party, information associated with unique identity data of the first wearable device or the second wearable device, information associated with a decentralized identity (DID) data of the first wearable device or the second wearable device, information associated with an identification data of the first wearable device or the second wearable device, or any combination thereof.

In some embodiments, the authentication information of the first party and the authentication information of the second party may be transmitted to a service providing server, and the service providing server may be configured to verify the authentication information of the first party and the authentication information of the second party based on a public key of the first party and a public key of the second party. In some other embodiments, the authentication information of the first party may be transmitted to the second wearable device, and the second wearable device may be configured to verify the authentication information of the first party based on the public key of the first party. Reciprocally, the authentication information of the second party may be transmitted to the first wearable device, and the first wearable device may be configured to verify the authentication information of the second party based on the public key of the second party.

Similar to the exemplary embodiments described above, the information configured for authentication based on the PKI certificate may include a second code contained in the PKI certificate, which is configured to be used in case that the first wearable device or the second wearable device is disconnected from a service providing server. When the second code is used for authentication, the first wearable device or the second wearable device may authorize a predetermined set of transactions that is more restricted than when the second code is not used.

In order to settle after the wearable devices are back on-line, the first wearable device or the second wearable device may store transaction information, and transmit the stored transaction information to the service providing server in response to the first wearable device or the second wearable device connecting to the service providing server. Subsequently, the service providing server may settle the transaction information.

In some embodiments, each of the first wearable device and the second wearable device may be implemented as a terminal, a smart phone, a smart watch, smart glasses, a smart ring, a smart speaker, a virtual reality (VR) headset, an augmented reality (AR) headset, a mixed reality (MR) headset, a wand, a gauntlet, a baton, or any combination thereof.

Figure 14A:
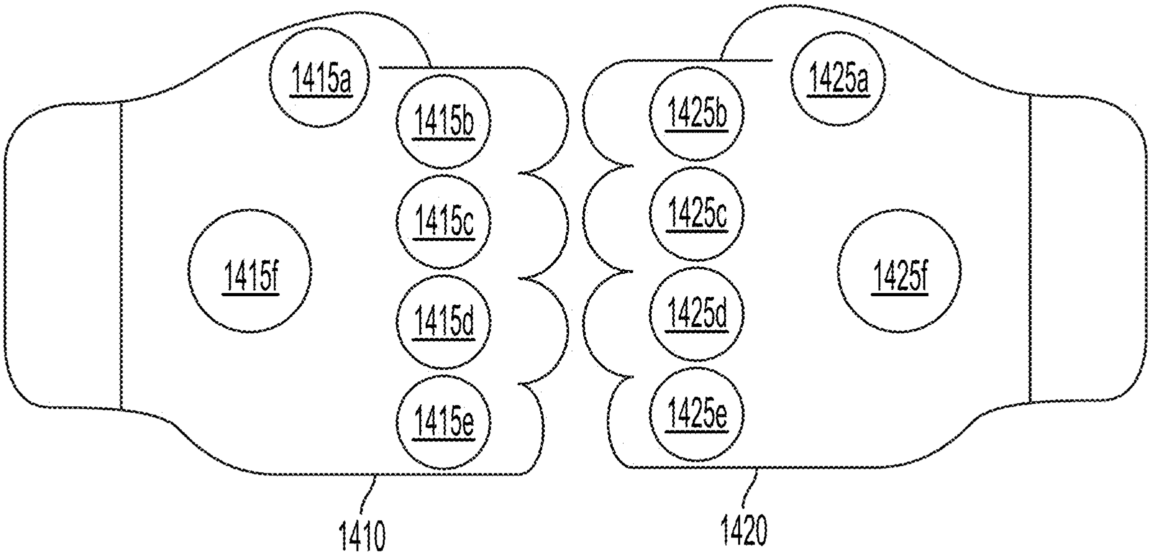
FIGS. 14A and 14B show examples of wearable devices used in electronic transaction according to exemplary embodiments of the present disclosure.
Figure 14B:
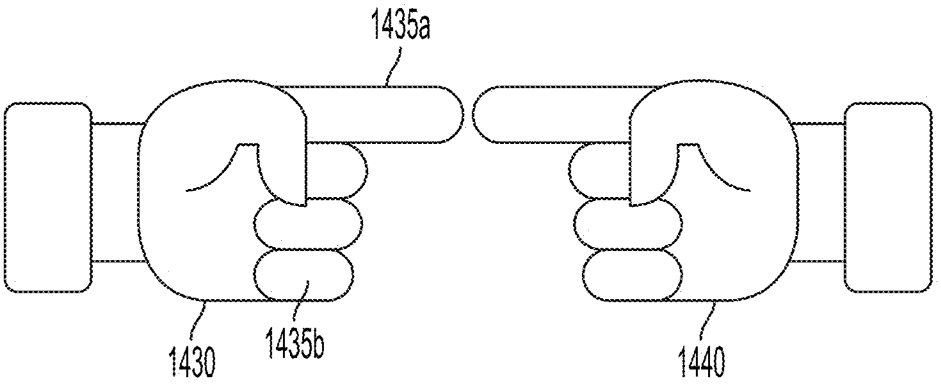

FIGS. 14A and 14B show examples of the electronic transaction methods using gloves or gauntlets in combination with a terminal, a smart phone, a smart watch, smart glasses, a smart ring, a smart speaker, a VR headset, an AR headset, an MR headset, a wand, a baton, a light sword, a motion suite, a motion simulator, or any combination thereof. For example, referring to FIG. 14A, each of the first wearable device 1410 and the second wearable device 1420 may be implemented as a gauntlet that includes a plurality of switches 1415*a*-1415*f* and 1425*a*-1425*f*. In this embodiment, different payment methods may be selected depending on which switch among the plurality of switches 1415*a*-1415*f* and 1425*a*-1425*f* is activated. For example, when the switch 1415*a* is activated, a credit card A may be used for the transaction. When the switch 1415*b* is activated, cryptocurrency or CBDC or the like may be used for the transaction. Other switches may be predetermined and assigned to different payment methods. In some embodiments, one of the switches may be assigned for emergency purpose. For example, when the switch 1415*c* is assigned as the emergency switch, and when it is activated for the transaction, an emergency signal may be transmitted to a predetermined address. The predetermined address may be set to a police server. As such, when the party is urged to make the transaction under a threat from another, the situation may be reported to the police.

In some embodiments, the electronic transaction methods can be performed using necklaces, bracelets, tattoos, or earrings. In such embodiments, different parts of the items or different gemstones on the items may serve the plurality of switches that are assigned to different payments methods may be selected.

FIG. 14B shows another example of the wearable devices. According to the example shown in FIG. 14B, each of the first wearable device 1430 and the second wearable device 1440 may be configured to select different payment or contract methods depending on which finger is used to contact the other wearable device, on the avatar-avatar basis or the avatar-hologram basis. For example, when the index finger 1435*a* is used, a credit card A may be used for the transaction. In some embodiments, one of the fingers may be assigned for emergency purpose. For example, when the pinky finger 1435*b* is assigned for emergency purpose, and when it is used for the transaction, an emergency signal may be transmitted to a predetermined address, such as a police server. As such, when the party is urged to make the transaction under a threat from another, the situation may be reported to the police.

In some embodiments, each of the first wearable device and the second wearable device may be implemented as smart glasses or a headset that are capable of virtual reality (VR), augmented reality (AR), mixed reality (MR), or any combination thereof, and a plurality of payment methods may be presented or displayed (in 2D or 3D) by the headset or smart glasses to allow the first party or the second party to choose a payment or contract method among the plurality of payment methods and virtual biometric contract methods.

In some such embodiments, the first wearable device or the second wearable device may further include a wand, a gauntlet, a baton, or a light sword to allow the first party or the second party to choose the payment or contract method among the plurality of payment methods and virtual biometric contract methods by a predetermined gesture with the wand, the gauntlet, the baton, or the light sword.

In some embodiments, a menu may be provided in a cyber space by a virtual ATM, a virtual POS, a virtual bank, a virtual asset icon fir crypto currency on a virtual space or a metaverse, and a particular item on the menu may be selected with a glove, a gauntlet, a wand, a baton, or a light sword As set forth herein, the methods based on chain of authentication using PKI according to the present disclosure may sequentially authenticate multiple parties and generate sequentially modified public keys that include authentication status of all the parties that have been previously authenticated. Accordingly, the system-wise security in services or transactions involving multiple parties may be improved while the number of required PKI certificates may be minimized. Further, due to the biometric code or the unique code inserted in the public and private keys, the biometric-based security may be embedded at the certificate level, and the use of certificate may be more strictly controlled by the administrative body of the service or transaction.

Exemplary Embodiment 8—Chain of Authentication on Metaverse-Metaverse or Metaverse-Reality Environment In general, PKI certificates are used for cross-signing among the root CAs and CAs that verify the issued PKI certificates. A cross-certificate is a digital certificate issued by a CA, and is used to sign the public key for the root certificate of another CA. Cross-certificates provide a means to create a chain of trust from a single, trusted, root CA to multiple other CAs. Herein, the term "verifying" may also be used in the context of chain of verification, and it may refer to verifying one or more additional codes that have been added in each certificate issued by each party of the chain of authentication, wherein the additional codes are added to an initial private key, as shown in FIG. 7. The first party, the second party, the third party, and so on, may verify whether the codes for different purposes have been verified in order to move to the next level. For some purposes, each party may verify the code from the immediate prior level.

In the related art, each metaverse platform has its own authentication system to manage its users and authenticate them. However, according to an exemplary embodiment of the present disclosure, a plurality of metaverse platforms may link their authentication systems and utilize the chain of authentication. More specifically, once a party is authenticated on a first metaverse platform based on a predetermined authentication method such as biometric authentication, the party's digital identity such as a metaverse ID or a metaverse pass may be registered in the first metaverse, which can then be used to log in to a second metaverse platform.

While the single-sign-on (SSO) method in the related art is used in the single system setting, the cross-authentication is used in the multi-to-multi setting among the application services associated by the metaverse-metaverse network. Accordingly, for the cross-authentication, the cross-signing hysteresis of each added certificate of the chain of authentication and the combination of codes that have been used for the authentication must be verified.

In some embodiments, when the cross-authentication within the metaverse-metaverse network is successful, lands, houses, or office use rights, non-fungible token (NFT), or the like may be acknowledged as legitimate properties in the metaverse, the property rights may become recognizable across the metaverse-metaverse network. Beginning with the initial authentication with the metaverse platform within the network, further authentication in each service platform may be acquired, for example, by following the level of key embodiments described herein. For the authentication, as discussed above, biometric authentication using a smartphone, an HMD, smart glasses, or the like may be utilized. The personal representation (e.g., an avatar) in the metaverse may commonly use payment methods such as a virtual wallet, crypto currency, CBDC, and the like, and virtual IDs such as driver's license across the network.

In some embodiments, physical IoT devices and equipment such as a TV, a refrigerator, a coffee machine, or the like may be implemented in the metaverse using the chain of authentication, allowing the registered user to be able to use them also in the metaverse-physical environment (e.g., smart home, smart city, or digital twin environment). By way of example, an IoT device configured to be operated with authentication in reality via voice, iris, face, or any combinations thereof may be implemented in the metaverse, such that the same voice authentication may be used to operate the IoT device in the metaverse environment.

To this end, the operation menu/panel of the IoT device may be displayed within the metaverse environment, allowing the user to operate the menu/panel using a glove, glasses, or other wearable devices. In response, the real IoT device, or the metaverse implementation of the corresponding IoT device, or both may be operated. In particular, a PKI certificate for the IoT device and a PKI certificate for the metaverse platform may be linked by a chain of authentication by, for example, inserting a code associated with the IoT device in the metaverse PKI certificate.

For another example, a user may participate in a virtual meeting in the metaverse using an HMD or smart glasses, and may concurrently operate various devices in the smart home, for example, to schedule automated cooking, to adjust the room temperature, or to order and receive food delivery through the metaverse without leaving the metaverse environment. As discussed above, to order and receive food delivery, the user may unlock the door for the deliverer after authenticating the delivery robot, may allow the delivery to be made to a designated place, and/or may authorize a payment to be made after confirming the delivery, all within the metaverse environment.

As described in the examples described above, since PKI certificates are linked via a chain of authentication, a user may wear an HMD, smart glasses, a glove, a gesture device, or other wearable devices/sensors to use the metaverse platform and be able to use payment methods, make financial transactions, or execute contracts in reality (e.g., smart home, smart city, or digital twin). Using similar implementations of the chain of authentication as described above, the metaverse system may be configured to display emergency alarms or disaster alerts provided by the government or public service providers. Further, criminal or unlawful activities within the metaverse environment may be reported to law enforcement agencies through the agency's metaverse presence or real presence (e.g., routing a phone call to 911). The report may be composed automatically according to predetermined formats, including the accused violator's biometric information, forensic data, captured footage or recording of the scene, or the like.

In some implementations, basic services may be provided to a user in the metaverse without requiring additional fares once the prerequisite level of key is authenticated. However, to use paid-for services in the metaverse, the system may require a higher-level key. These paid-for services may be used on per-use basis or on subscription basis. Family subscription or subscription with pet members may be also available. Some subscriptions or services may pose a minimum age requirement. Various transportation modes may be implemented within the metaverse as well. For example, bicycles, kickboards, motorcycles, automobiles, airplanes, or teleport may be provided for the users to use after being authenticated for the respective services.

Hereinabove, although the present disclosure is described by specific matters such as concrete components, and the like, the exemplary embodiments and the drawings are provided merely for assisting in the entire understanding of the present disclosure. Therefore, the present disclosure is not limited to the exemplary embodiments described herein. Various modifications and changes can be made by a person of ordinary skill in the art to which the present disclosure pertains. The spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. A method comprising:

generating, by a first party, a first private key and a first public key corresponding to each other;

generating, by a second party, a second private key and a second public key corresponding to each other;

signing, by the first party, the first public key with the first private key, thereby generating a first modified public key;

transmitting, from the first party to the second party, the first modified public key;

verifying, by the second party, the first modified public key based on the first public key belonging to the first party;

in response to successfully verifying the first modified public key, generating, by the second party, a second modified public key by concatenating:

(a) the first modified public key; and (b) the second public key signed with the second private key, generating, by a third party, a third private key and a third public key corresponding to each other;

transmitting, from the second party to the third party, the second modified public key;

verifying, by the third party, the second modified public key based on the second public key belonging to the second party;

in response to successfully verifying the second modified public key, generating, by the third party, a third modified public key by concatenating:

(a) the second modified public key; and (b) the third public key signed with the third private key;

transmitting, from the third party to the first party, the third modified public key; and verifying, by the first party, the third modified public key based on the third public key belonging to the third party, wherein the first party is set to order an item from the second party, and the third party is set to deliver the item from the second party to the first party, and wherein the transmitting of the first modified public key from the first party to the second party, the transmitting of the second modified public key from the second party to the third party, and the transmitting of the third modified public key from the third party to the first party define a transmission loop.

2. The method of claim 1, wherein the first private key and the first public key are generated by the first party based on a protocol defined in a first public key certificate in which a first code is inserted, wherein the second private key and the second public key are generated by the second party based on a protocol defined in a second public key certificate in which a second code is inserted, and wherein the third private key and the third public key are generated by the third party based on a protocol defined in a third public key certificate in which a third code is inserted.

3. The method of claim 2, wherein each of the first code, the second code, and the third code includes information associated with biometric data, information associated with unique identity information, information associated with an Internet of Things device, information associated with a QR code, information associated with an identity information, information associated with electronic money, information associated with a cryptographic hash function address, information associated with a crypto currency, information associated with digital cash, information associated with central bank digital currency (CBDC), information associated with blockchain, information associated with a decentralized identifier (DID), or any combination thereof.

4. The method of claim 1, wherein the first private key and the first public key are generated based on a protocol defined in a first public key certificate in which a first code that corresponds to or is associated with biometric data or a combination of pieces of biometric data of a registered person and an Internet of Things (IoT) code that corresponds to or is associated with a registered Internet of Things (IoT) device are inserted, wherein the second private key and the second public key are generated based on a protocol defined in a second public key certificate in which a second code that corresponds to or is associated with unique identity information or a combination of pieces of unique identity information of the second party is inserted, and wherein the third private key and the third public key are generated based on a protocol defined in a third public key certificate in which a third code that corresponds to or is associated with unique identity information of the third party is inserted.

5. The method of claim 4, wherein the registered IoT device is configured to authenticate the third party in response to verifying the second public key based on the third public key.

6. The method of claim 4, wherein, in response to successfully verifying the third party, the registered IoT device is configured to perform a predetermined action to receive the item, and wherein the predetermined action includes opening a door, opening a trunk of a car, opening a container of a delivery robot or a self-driving shuttle, opening a locked delivery box, allowing use of a charging station, approving landing of a delivery drone, or any combination thereof.

7. The method of claim 6, wherein the third party is configured to perform removal of wrapping material, assembly of product, collection of old product, collection of wrapping material, presentation of instruction on product assembly and/or use, or any combination thereof, which is performed by an avatar or a hologram.

8. The method of claim 1, wherein the third party is configured to terminate delivery of the item in response to receiving a kill public key.

* * * * *